（12）United States Patent
Ayers et al.

(10) Patent No.: US 9,707,840 B2
(45) Date of Patent: *Jul. 18, 2017

(54) VENTED VALVE CAP

(71) Applicant: Central Illinois Manufacturing Company, Bement, IL (US)

(72) Inventors: Jeffrey Alan Ayers, Decatur, IL (US); Matthew David Valentine, Bement, IL (US); Vickie Lynn Conlin, Arthur, IL (US)

(73) Assignee: Central Illinois Manufacturing Company, Bement, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/288,048

(22) Filed: Oct. 7, 2016

(65) Prior Publication Data

US 2017/0021722 A1    Jan. 26, 2017

Related U.S. Application Data

(63) Continuation of application No. 14/979,074, filed on Dec. 22, 2015, now Pat. No. 9,493,066.

(60) Provisional application No. 62/096,858, filed on Dec. 25, 2014, provisional application No. 62/119,331, filed on Feb. 23, 2015.

(51) Int. Cl.
*B60K 15/035* (2006.01)
*B60K 15/04* (2006.01)

(52) U.S. Cl.
CPC ........ *B60K 15/035* (2013.01); *B60K 15/0406* (2013.01); *B60K 2015/03547* (2013.01)

(58) Field of Classification Search
CPC ............ B60K 15/0409; B60K 15/0406; B60K 15/03519; B60K 15/03547; B60K 15/035
USPC ...... 220/203.1, 203.25, 203.23, 203.26, 303, 220/304
See application file for complete search history.

(56) References Cited

U.S. PATENT DOCUMENTS

| 3,807,219 | A |   | 4/1974  | Wallskog |            |
|-----------|---|---|---------|----------|------------|
| 4,036,399 | A |   | 7/1977  | Gerdes   |            |
| 4,440,308 | A |   | 4/1984  | Baker    |            |
| 4,676,390 | A |   | 6/1987  | Harris   |            |
| 4,779,755 | A |   | 10/1988 | Harris   |            |
| 4,887,733 | A | * | 12/1989 | Harris   | B60K 15/0406 |
|           |   |   |         |          | 220/203.06 |

(Continued)

OTHER PUBLICATIONS

Belleville washer, Wikipedia definition, https://en.wikipedia.org/wiki/Belleville_washer, downloaded Dec. 3, 2015.

(Continued)

*Primary Examiner* — King M Chu
(74) *Attorney, Agent, or Firm* — Michael Stanley Tomsa; McAndrews, Held & Malloy, Ltd.

(57) ABSTRACT

A fuel cap is described as having a top assembly and a bottom assembly slidably engaged with, and concentric to, the top assembly. The top assembly having a cap cover and a cylindrical cap body concentric with and protruding substantially perpendicularly from, an underside surface of the cap cover. The bottom assembly having a vacuum valve operatively coupled with a valve body. A wire-form keeper may slidably secure the bottom assembly to the top assembly. A pressure spring may impart a force that biases said bottom assembly away from said top assembly.

20 Claims, 26 Drawing Sheets

(56) References Cited

U.S. PATENT DOCUMENTS

| | | | |
|---|---|---|---|
| 5,167,340 A | 12/1992 | Shaw | |
| 5,203,466 A * | 4/1993 | Kasugai | B60K 15/0406 |
| | | | 137/516.27 |
| 5,520,300 A * | 5/1996 | Griffin | B60K 15/0409 |
| | | | 220/210 |
| 5,570,730 A | 11/1996 | Keehn, Jr. et al. | |
| RE36,959 E | 11/2000 | Griffin | |
| 6,298,712 B1 * | 10/2001 | Docy | G01M 3/3236 |
| | | | 73/40 |
| 6,364,145 B1 * | 4/2002 | Shaw | B60K 15/035 |
| | | | 220/203.11 |
| 7,578,405 B2 * | 8/2009 | Hagano | B60K 15/03519 |
| | | | 220/203.23 |
| 8,567,628 B2 * | 10/2013 | Dunkle | B60K 15/0406 |
| | | | 220/203.01 |
| 8,833,346 B2 * | 9/2014 | Whelan | F02M 37/0076 |
| | | | 123/516 |
| 2015/0041466 A1 | 2/2015 | Koishikawa et al. | |

OTHER PUBLICATIONS

Wave spring, Wikipedia definition, https://en.wikipedia.org/wiki/Wave_spring, downloaded Dec. 3, 2015.
Specification Sheet for "PRE-VENT Vapor Control Cap".

* cited by examiner

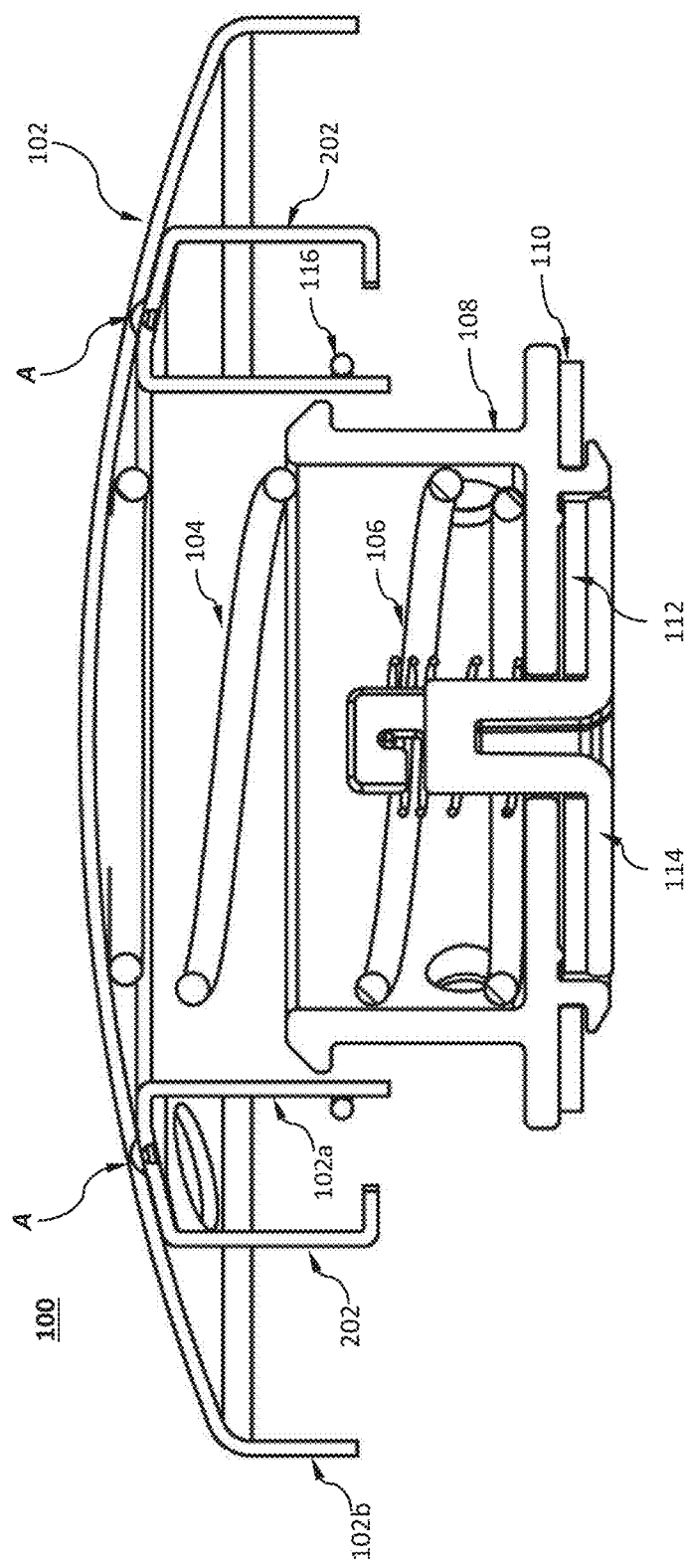

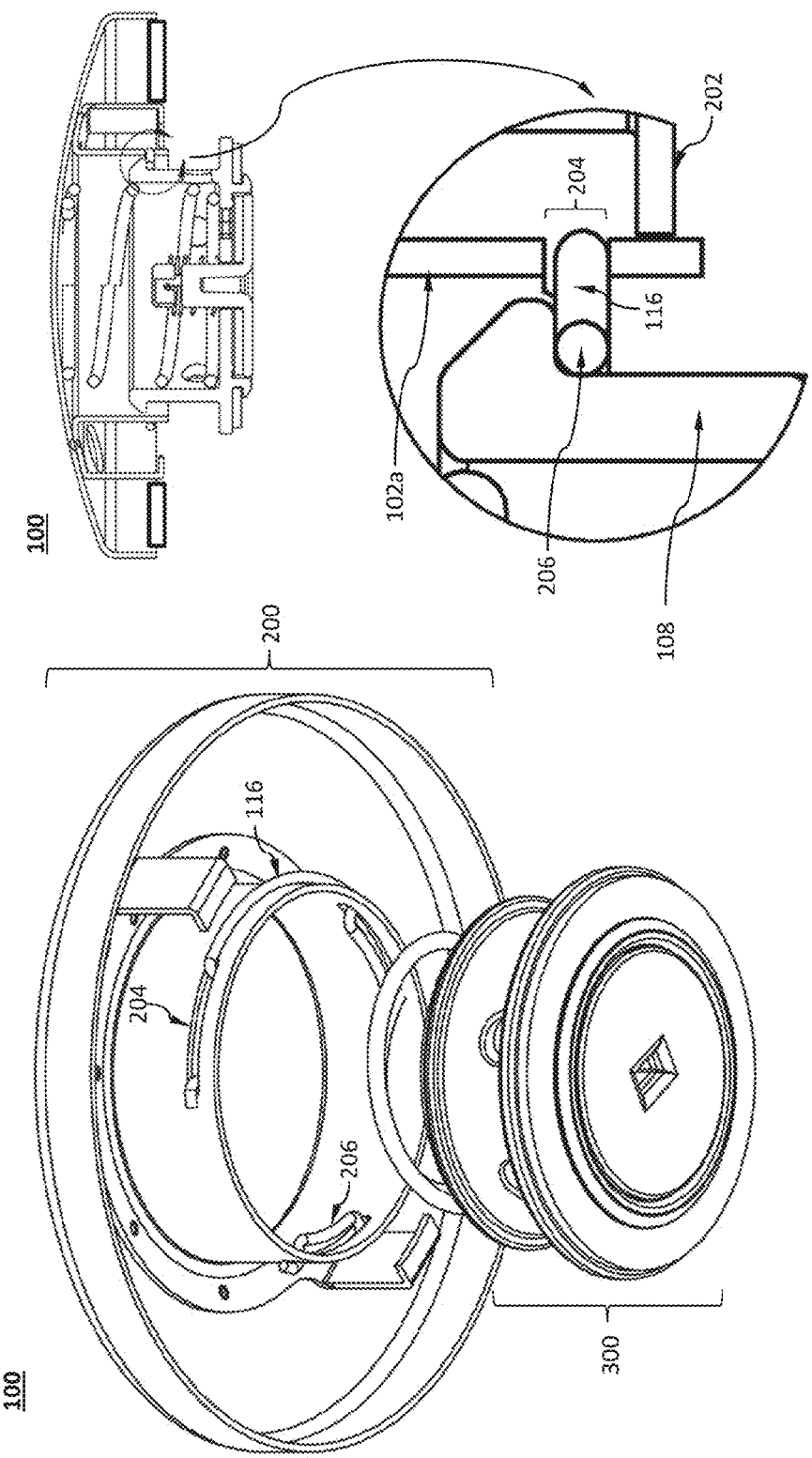

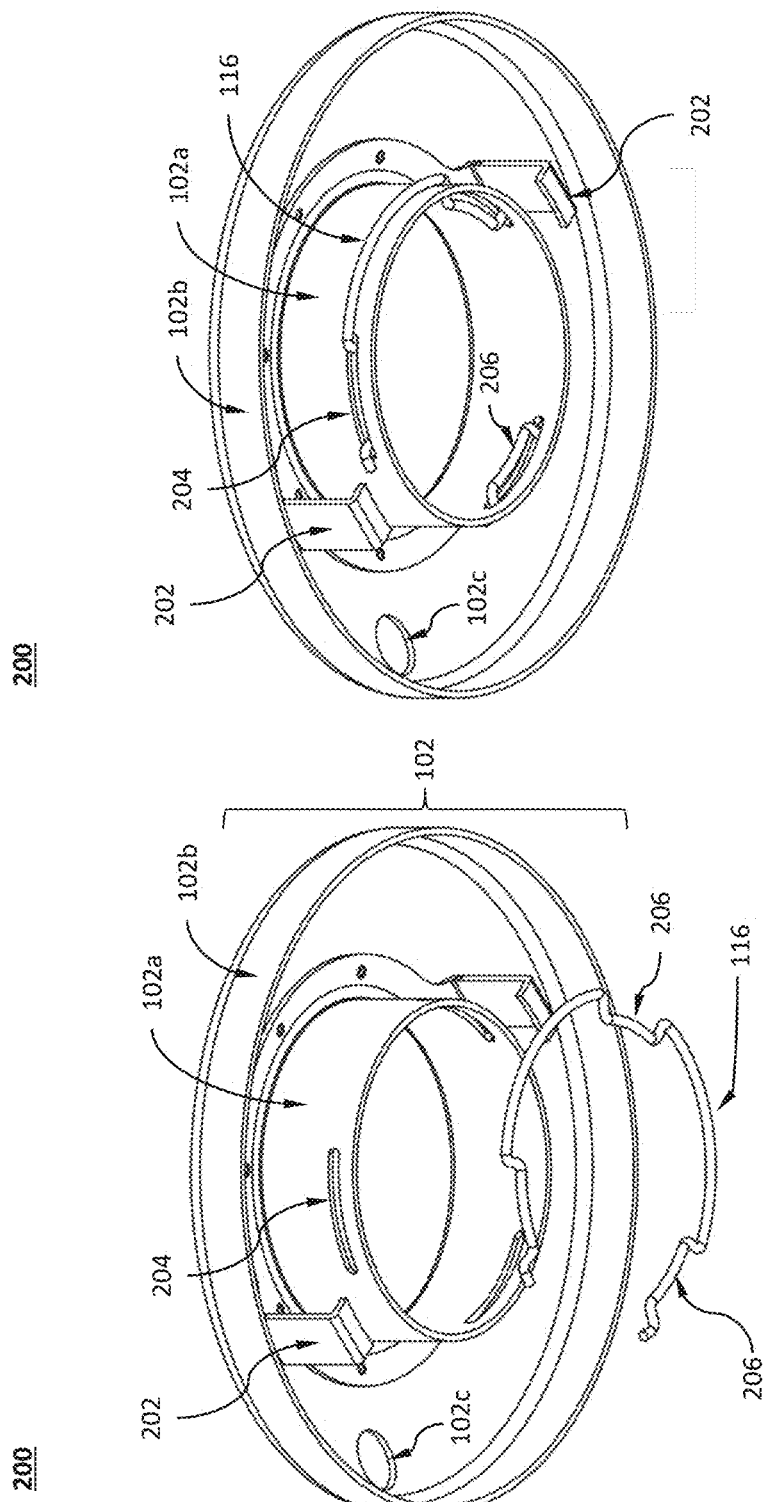

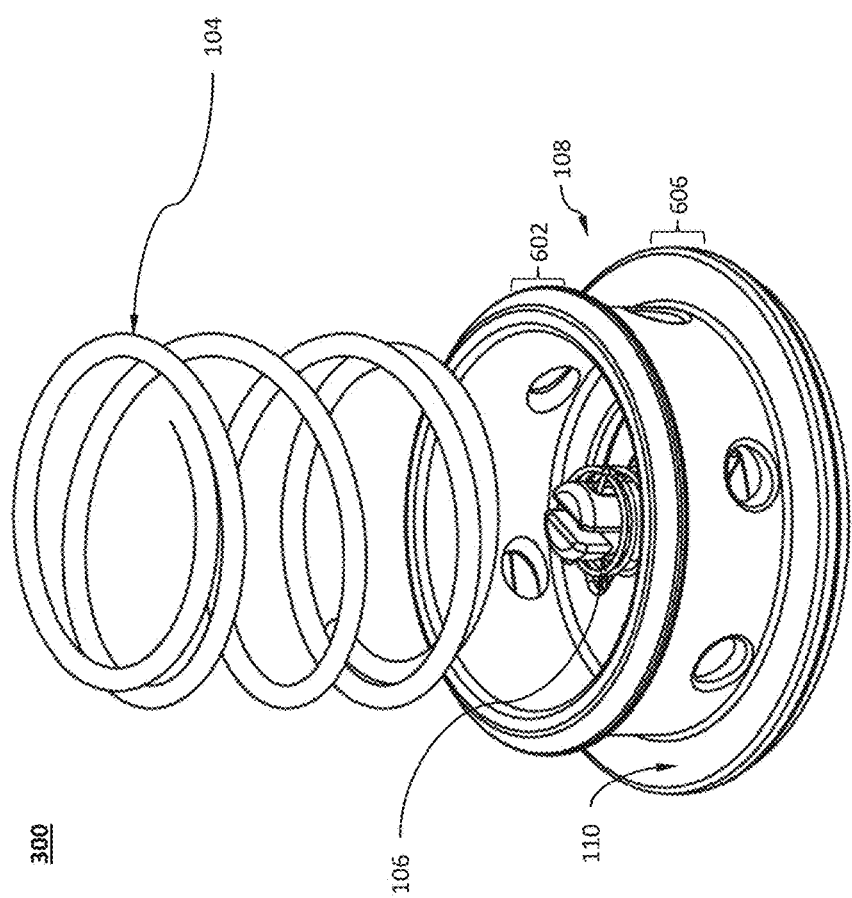

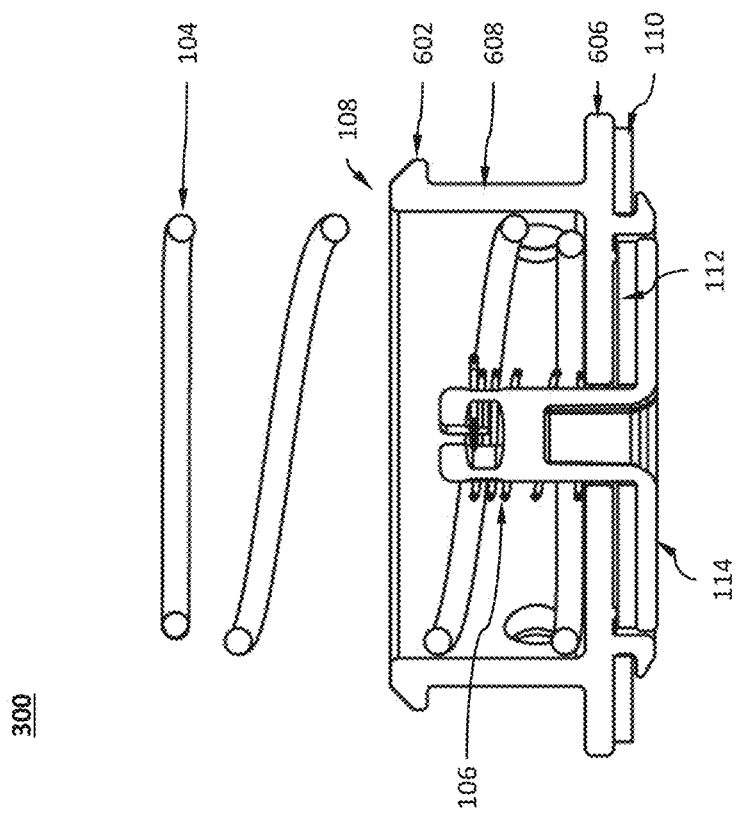
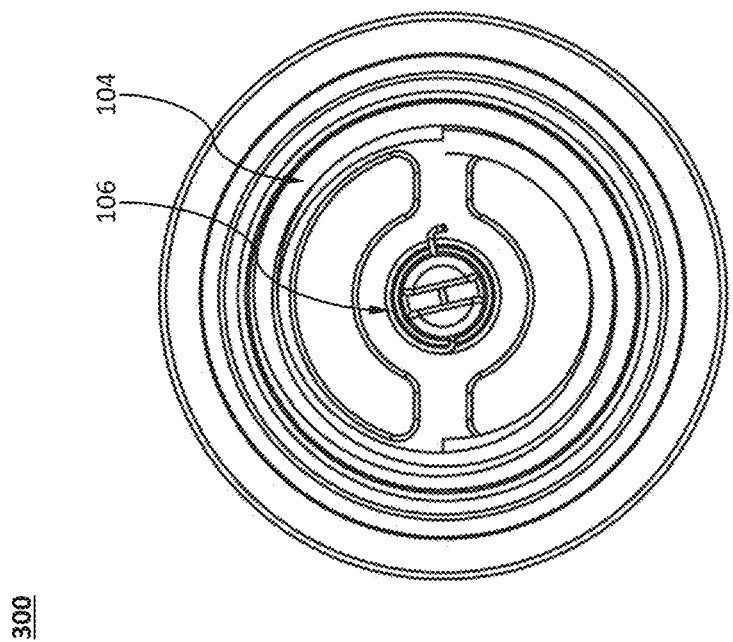
Figure 3c
Figure 3b

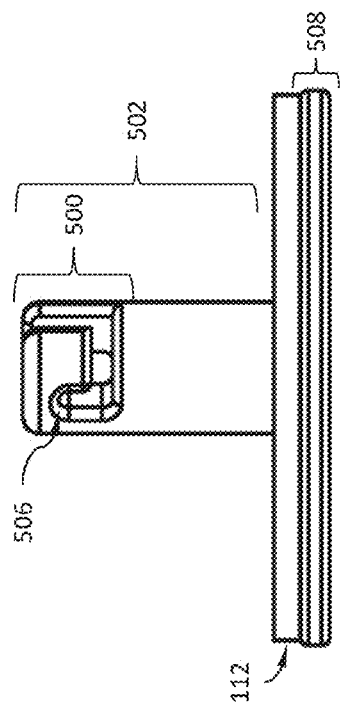
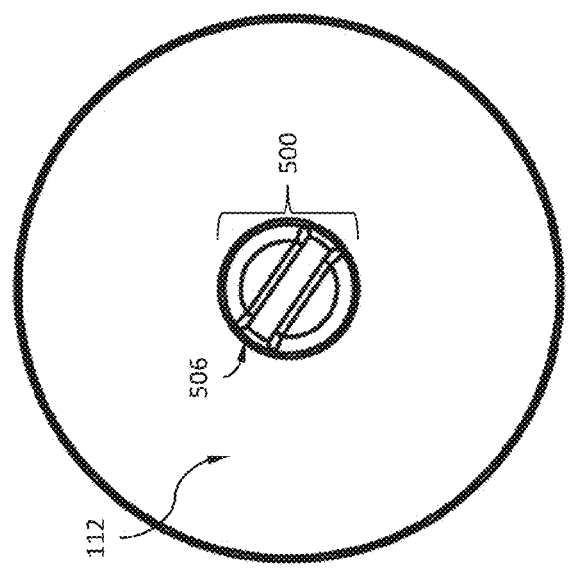
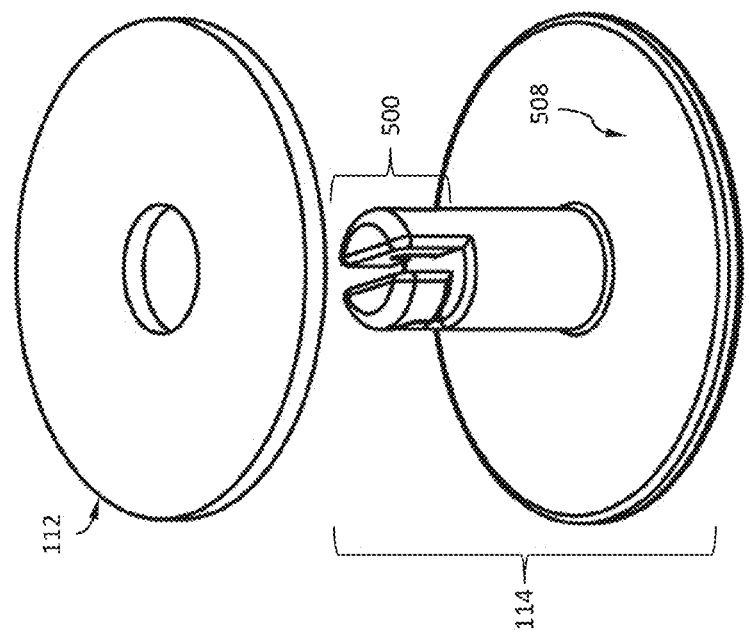
Figure 5b
Figure 5c
Figure 5a

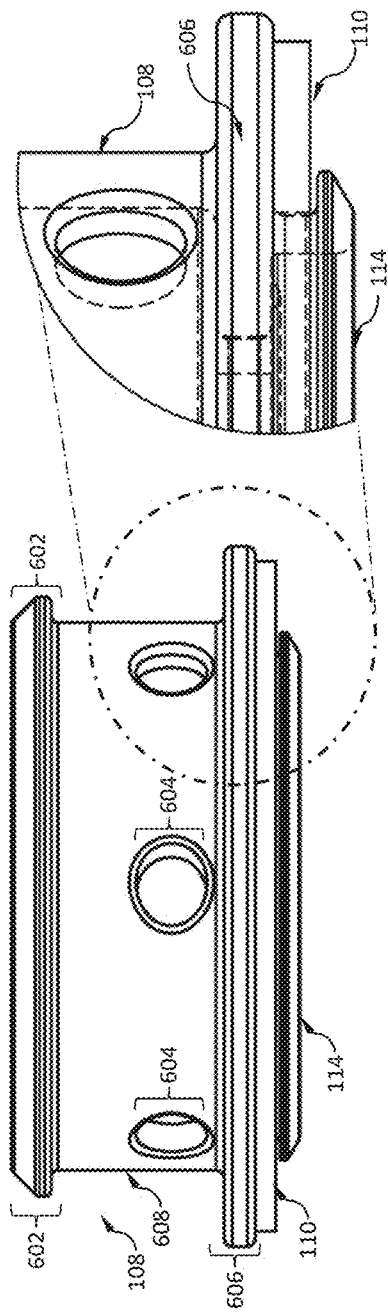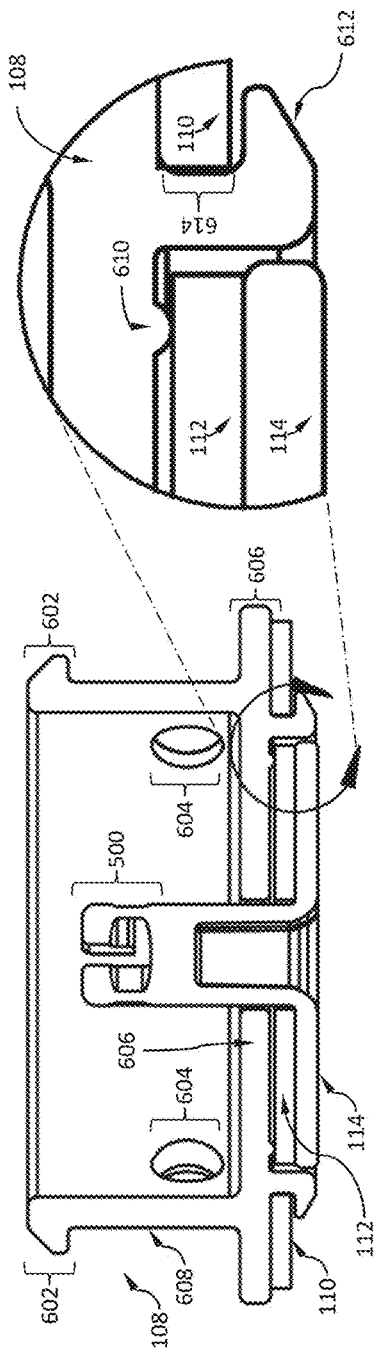

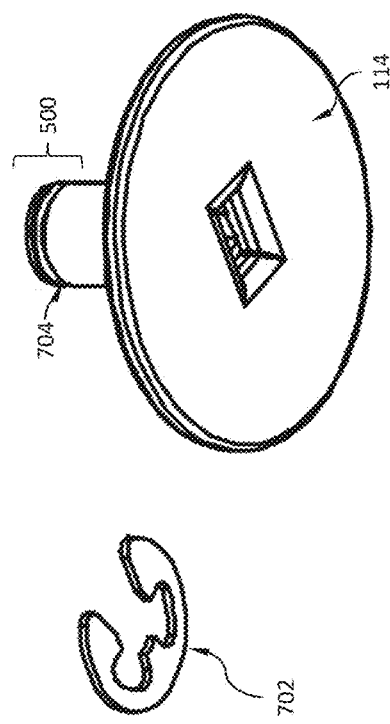
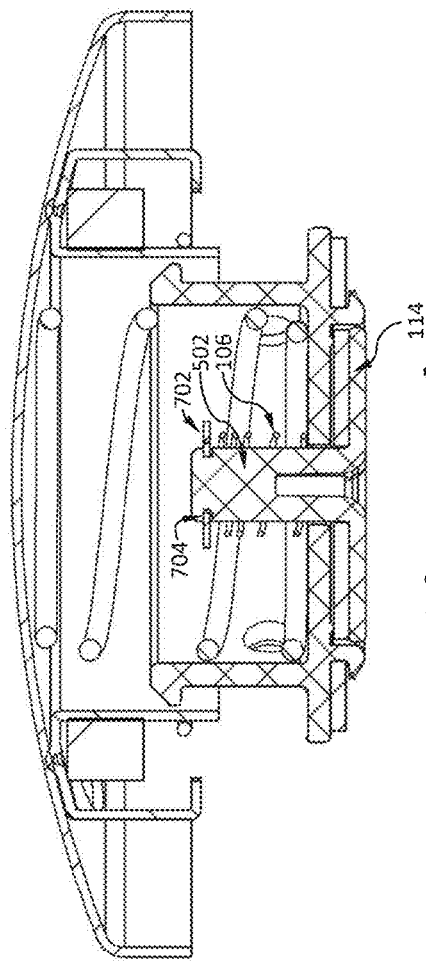

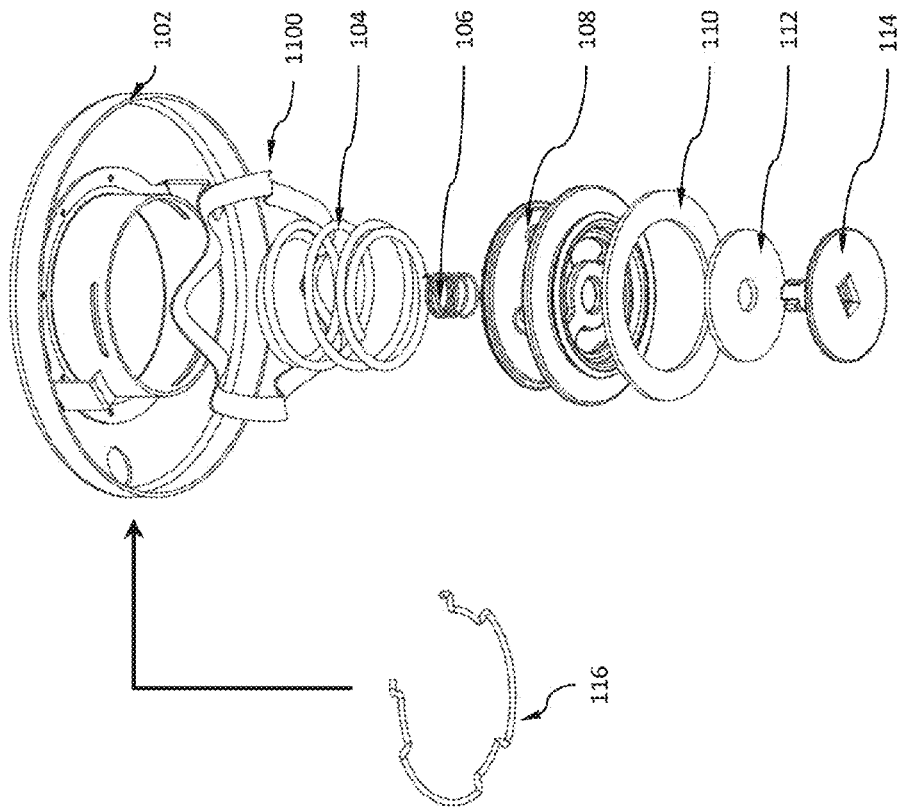
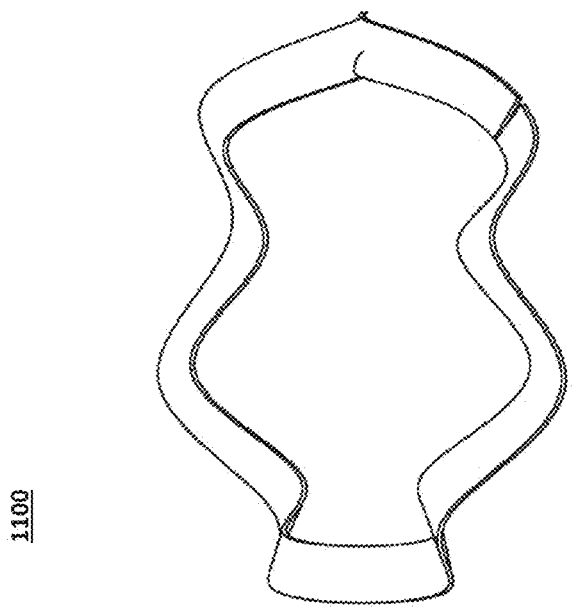
Figure 11b
Figure 11a

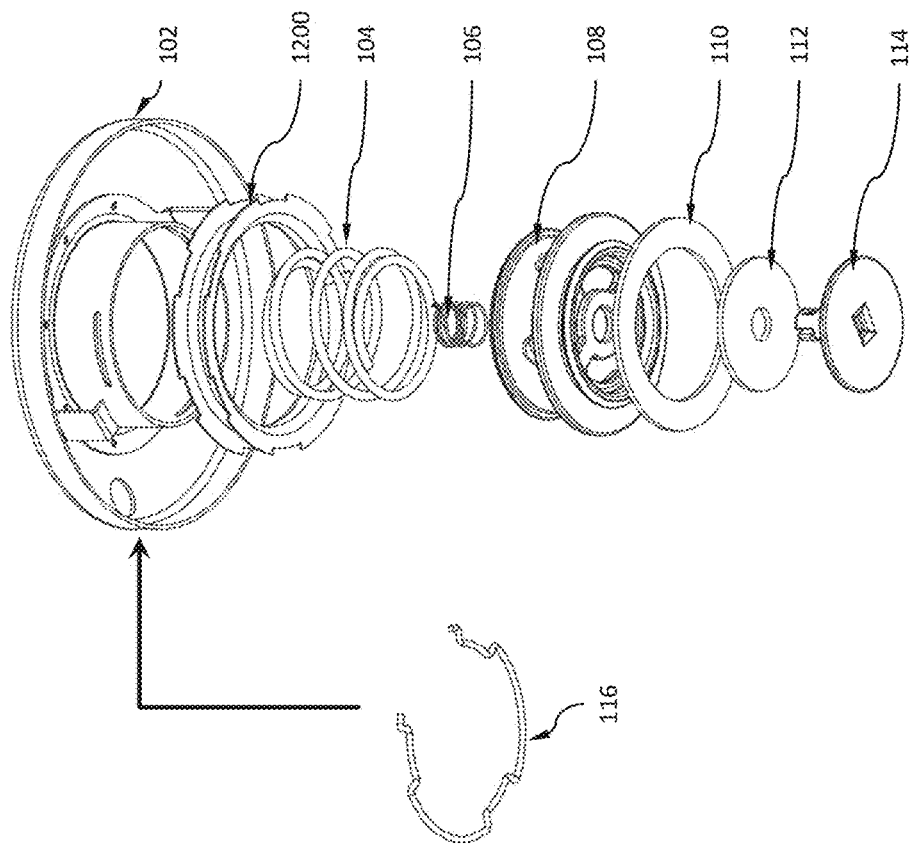
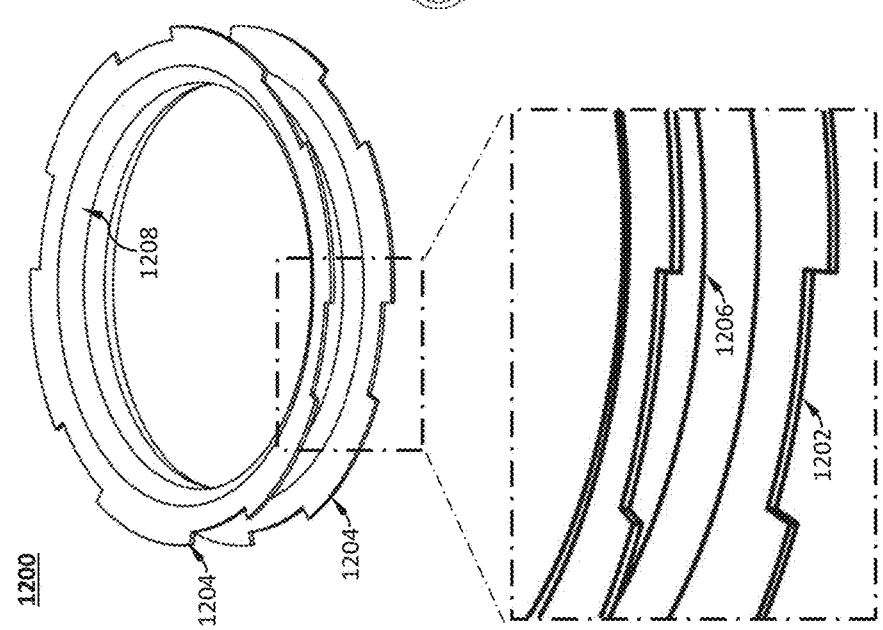

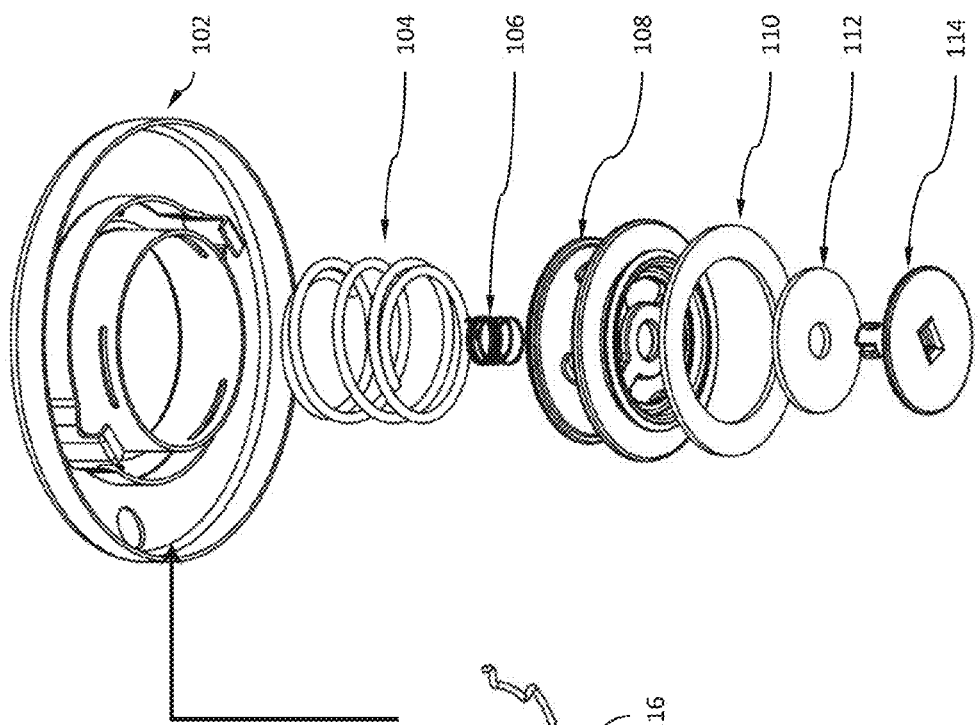
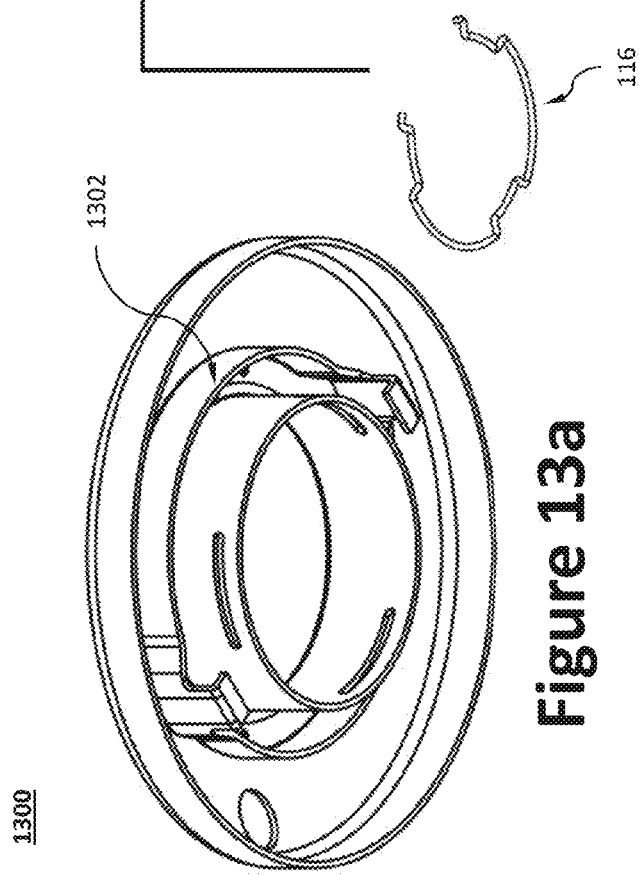
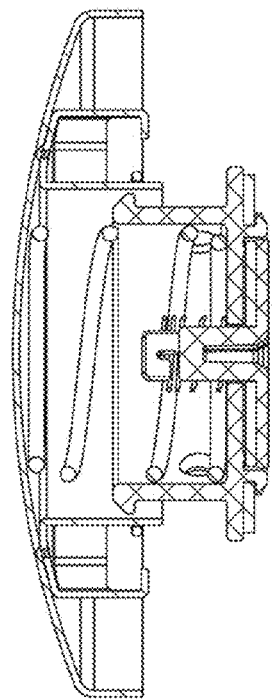
Figure 13a
Figure 13b
Figure 13c

VENTED VALVE CAP

CROSS REFERENCE TO RELATED APPLICATIONS

This application is a continuation of U.S. patent application Ser. No. 14/979,074, filed on Dec. 22, 2015, which in turn claims priority to U.S. Provisional Patent Application No. 62/096,858, filed on Dec. 25, 2014, and 62/119,331, filed on Feb. 23, 2015, each entitled "Vented Valve Cap" by Jeffrey Alan Ayers et al. Each application is hereby incorporated by reference in their entirety.

TECHNICAL FIELD

The present invention relates to the field of fluid tanks; more particularly, to vented valve caps for use with fluid tanks.

BACKGROUND

Various types of fuels may be stored in remote, portable, or transportable tanks to facilitate point of use refueling. Examples of such applications include, without limitation, construction and agriculture. These fuels may include, for example, diesel, gasoline, and kerosene. Often, these types of tanks are not permanent installations, but rather, are meant to be moveable. With these tanks exists a need to seal the tank, while permitting quick and easy fluid removal and replacement. Further, to account for pressure changes that result from a change in fuel volume within the tank, a need further exists to vent the tank.

As will be appreciated by those of ordinary skill in the art, the volume of fuel within a tank can fluctuate over time due to a number of factors, including, for example, fuel being syphoned off (e.g., used to fuel a device), evaporation of the fuel, as well thermal expansion, which may be due to ambient temperature changes. That is, changes in temperature can cause the fuel to expand or contract, thus changing its volume. It is therefore advantageous to counter pressure changes using, for example, a vented fill cap.

Vented fill caps serve two general purposes: (1) to seal the tank to prevent contaminant ingression and evaporative fuel loss; and (2) to provide pressure equalization between the interior of the tank and the atmosphere (i.e., the air/gas external to the tank). Failure to provide pressure equalization between the interior of the tank and the atmosphere when internal tank pressure increases and/or when a vacuum is created can result in destruction of the tank (e.g., due to excess pressure or vacuum). Thus, what is needed is an improved vented fill cap that seals the tank, while permitting for pressure equalization.

SUMMARY OF THE INVENTION

The present invention is directed to a vented cap for use with, inter alia, fuel tanks.

According to a first aspect, a venting apparatus comprises: a cap cover having a cylindrical cap body concentric with, and protruding substantially perpendicularly from, an underside surface of the cap cover; a bottom assembly slidably engaged with, and concentric to, the cap cover, wherein the bottom assembly is sized and shaped to at least partially reside within the cylindrical cap body, the bottom assembly having a vacuum valve slidably engaged with a valve body, wherein the vacuum valve and the valve body are arranged substantially concentric to one another, the vacuum valve being moveable between a first position and a second position, wherein the vacuum valve prevents flow through the valve body in the first position and permits flow through the valve body in the second position; a vacuum spring to bias the vacuum valve in the first position; and a pressure spring residing at least partially within each of the valve body portion and the cylindrical cap body, wherein the pressure spring is configured to impart a force that biases said bottom assembly away from said cap cover.

According to a second aspect, a fuel cap comprises: a top assembly having a cap cover and a cylindrical cap body, the cylindrical cap body protruding substantially perpendicularly from an underside surface of the cap cover; a bottom assembly slidably engaged with, and concentric to, the top assembly, the bottom assembly having a vacuum valve operatively coupled with a valve body; a keeper device to slidably secure the bottom assembly to the top assembly, wherein the bottom assembly is sized and shaped to at least partially reside within the cylindrical cap body; and a pressure spring to impart a force that biases said bottom assembly away from said top assembly.

According to a third aspect, a venting apparatus comprises: a cap cover, the cap cover having a cap cover and a cylindrical cap body, the cylindrical cap body protruding substantially perpendicularly from an underside surface of the cap cover; a bottom assembly slidably engaged with, and concentric to, the cap cover, the bottom assembly having a vacuum valve operatively coupled with a valve body, wherein the valve body comprises a cylindrical valve body portion, the cylindrical valve body portion sized and shaped to reside at least partially within the cylindrical cap body; and a pressure spring, the pressure spring residing at least partially within each of the cylindrical valve body portion and the cylindrical cap body, wherein the pressure spring is configured to impart a force that biases said bottom assembly away from said cap cover.

According to a fourth aspect, a venting apparatus for managing flow through a fill cap base comprises: a top assembly, the top assembly having a cap cover and a cylindrical cap body concentric with, and protruding substantially perpendicularly from, an underside surface of the cap cover; a bottom assembly slidably engaged with, and concentric to, the top assembly, the bottom assembly having a vacuum valve operatively coupled with a valve body, wherein the vacuum valve comprises a vacuum base and a vacuum stem perpendicularly positioned on said vacuum base, wherein the valve body comprises (1) a cylindrical valve body portion having a first vent hole and (2) a valve base at a first end of said cylindrical valve body portion, the valve base having a second vent hole and a through hole configured to receive the vacuum stem, wherein the vacuum base and the valve base are arranged substantially concentric and parallel to one another, the vacuum base being moveable between a first position and a second position, wherein the vacuum base prevents flow through the second vent hole in the first position and permits flow through the second vent hole in the second position, the vacuum base being biased in the first position by a vacuum spring; and a pressure spring, the pressure spring residing at least partially within each of the cylindrical valve body portion and the cylindrical cap body, wherein the pressure spring is configured to impart a force that biases said bottom assembly away from said top assembly.

In certain aspects, a wire-form keeper engages said cylindrical cap body and said cylindrical valve body portion, thereby slidably securing the bottom assembly to the top assembly.

In certain aspects, the cylindrical valve body portion comprises a rib at a second end of said cylindrical valve body portion, the rib extending along the circumference of the second end of said cylindrical valve body portion.

In certain aspects, the cylindrical valve body portion comprises a slot and the wire-form keeper comprises a keeper indentation, the keeper indentation being configured to pass through the slot and to engage the rib.

In certain aspects, the top assembly further comprises a securing tab configured to engage a fill cap base.

In certain aspects, the pressure spring is configured to impart a sealing force that forms a seal between the bottom assembly and the fill cap base when the top assembly engages a fill cap base.

In certain aspects, the bottom assembly is configured to move toward said top assembly when a positive pressure at the fill cap base overcomes the sealing force, thereby breaking a seal between the bottom assembly and the fill cap base.

In certain aspects, the vacuum base moves to the second position when a negative pressure at the fill cap base overcomes the vacuum spring's force, thereby permitting flow through the first vent hole and the second vent hole.

In certain aspects, a pressure gasket is positioned on the valve base, the pressure gasket configured to form an airtight seal between the valve base and a fill cap base.

In certain aspects, a vacuum gasket is positioned on the vacuum base, the vacuum gasket configured to form an airtight seal between the vacuum base and the valve base.

In certain aspects, a stability shim is positioned on the underside surface of the cap cover, whereby the stability shim restricts lateral movement of the venting apparatus when installed upon a fill cap base.

In certain aspects, the stability shim is fabricated from a fuel resistant flexible material.

In certain aspects, the vacuum stem passes through the vacuum spring, the vacuum stem being configured to secure an end of the vacuum spring at the vacuum stem's distal end.

DESCRIPTION OF THE DRAWINGS

These and other advantages of the present invention will be readily understood with the reference to the following specifications and attached drawings, where like reference numbers refer to like structures. The figures are not necessarily to scale, emphasis is instead placed upon illustrating the principles of the devices, systems, and methods described herein.

FIG. 1b illustrates a cross-sectional side view of an assembled vented valve cap.

FIG. 1c illustrates an assembly view of the vented valve cap's top assembly and bottom assembly.

FIG. 1d illustrates an exploded view of the wire-form keeper when the vented valve cap is assembled.

FIG. 2c illustrates a perspective view of the underside of the top assembly with the wire-form keeper disengaged.

FIG. 2d illustrates a perspective view of the underside of the top assembly with the wire-form keeper engaged.

FIG. 3a illustrates a perspective view of the topside of the bottom assembly.

FIG. 3b illustrates a top plan view of the topside of the bottom assembly.

FIG. 3c illustrates a cross-sectional side view of the bottom assembly.

FIG. 5a illustrates a perspective view of the vacuum valve and vacuum gasket of the bottom assembly.

FIG. 5b illustrates a side view of the vacuum valve with the vacuum gasket installed.

FIG. 5c illustrates a top plan view of the vacuum valve with the vacuum gasket installed.

FIG. 6c illustrates a side view of the valve body with the vacuum valve installed.

FIG. 6d illustrates a cross-sectional side view of the valve body with the vacuum valve installed.

FIGS. 7c and 7d illustrate an exemplary arrangement for securing the vacuum spring using an e-clip.

FIG. 11a illustrates a wave spring stability shim.

FIG. 11b illustrates an example assembly view of a vented valve cap having a wave spring stability shim.

FIG. 12a illustrates a formed stability shim.

FIG. 12b illustrates an example assembly view of a vented valve cap having a wave spring stability shim.

FIGS. 13a through 13c illustrate an inner cap having a stability ring.

DETAILED DESCRIPTION

Figure 1A:
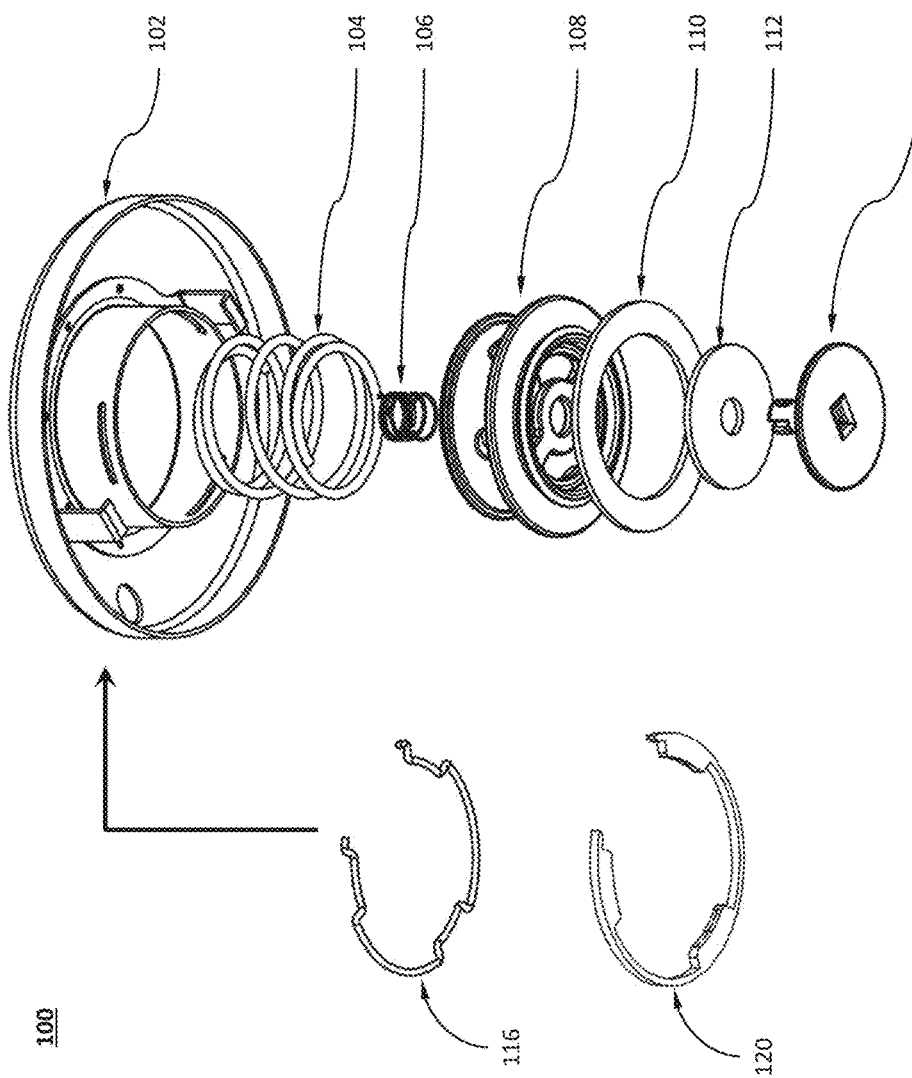
FIG. 1a illustrates an assembly view of a vented valve cap in accordance with an aspect of the present invention.

Preferred embodiments of the present invention will be described herein with reference to the accompanying drawings. In the following description, well-known functions or constructions are not described in detail because they may obscure the invention in unnecessary detail.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein is merely intended to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "side," "front," "back," and the like are words of convenience and are not to be construed as limiting terms. Further, the word "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

A vented fill cap may provide a number of advantages. First, a vented fill cap should provide an adequate seal while permitting for quick removal and reconnection, thereby increasing convenience when refilling the tank. An adequate seal prevents ingression of contaminants into the fuel storage tank. Contaminants, such as water, can lead to the growth of bacteria, corrosion of the tank and system components, and/or cause damage to downstream equipment. Similarly, dirt (or dust) contaminants can cause premature equipment wear (pumps, nozzles, etc.) as well as cause damage to downstream equipment. Further, an adequate seal mitigates evaporative loss of certain types of fluids, such as gasoline. The reduction of evaporation loss yields economic returns as well as reducing air pollution and hazards.

Second, a vented fill cap should accommodate pump flow rates by admitting compensatory air into the tank (e.g., a volume of air to offset the volume of fuel removed) while maintaining a minimal vacuum in the tank, thereby allowing for rapid removal of fuel from the tank (e.g., with a pump) with the vented fill cap still installed. Thus, a vented fill cap can provide appropriate pressure equalization between the tank and the atmosphere, and then reseal after venting excess pressure or drawing in air to relieve the vacuum. To maintain the integrity of the tank, while prohibiting a perpetual vent to atmosphere, the vented fill cap may be configured to vent at a predetermined pressure. For example, the vented fill cap may vent at about 1.25 to 1.5 psig (pound-force per square inch gauge), while in other aspects, this pressure could be configured to vent at up to about 2.5 psig. Unlike with vented fuel tank caps employed in automobiles, vented fill caps for storage tanks must allow for the quick removal of large amounts of fluid. For example, fuel transfer pumps can dispense upwards of 30 gallons per minute (GPM), which allows for fueling of mobile equipment (e.g., farm vehicles, mobile tanks, etc.) in a reasonable amount of time without requiring the removal of the vented fill cap.

Finally, the vented fill cap may be interchangeable between manufacturers, thus enabling them to fit on existing vented fill cap bases. As is known to those of skill in the art, a fill cap base generally refers to a type of fitting that couples the vented fill cap to a bunghole in the top of commonly available fuel storage tanks. For example, fuel storage tanks typically employ a two-inch National Pipe Thread Taper (NPT) bunghole. Further, it is recommended that vented fill caps are replaced periodically, typically at three-year intervals. This ensures that gasket materials, which often degrade with time, are still in a functional condition. Thus, it is desired that vented fill caps be interchangeable between various manufacturers' fill cap bases, especially in the event that the original cap and base manufacturers are no longer available.

Turning now to the figures, FIG. 1a illustrates an exploded assembly view of a vented valve cap 100 in accordance with an aspect of the present invention, which meets the above objectives. As illustrated, the vented valve cap 100 may comprise a cap cover 102, a pressure spring 104, a vacuum spring 106, a valve body 108, a pressure gasket 110, a vacuum gasket 112, a vacuum valve 114, and a wire-form keeper 116. The various components of the vented valve cap 100 are generically concentric to one another (sharing the same center point). FIG. 1b illustrates a cross-sectional side view of an assembled vented valve cap 100, while FIGS. 1c and 1d illustrate assembly views of the vented valve cap's 100 top assembly 200 and bottom assembly 300.

Figure 1G:
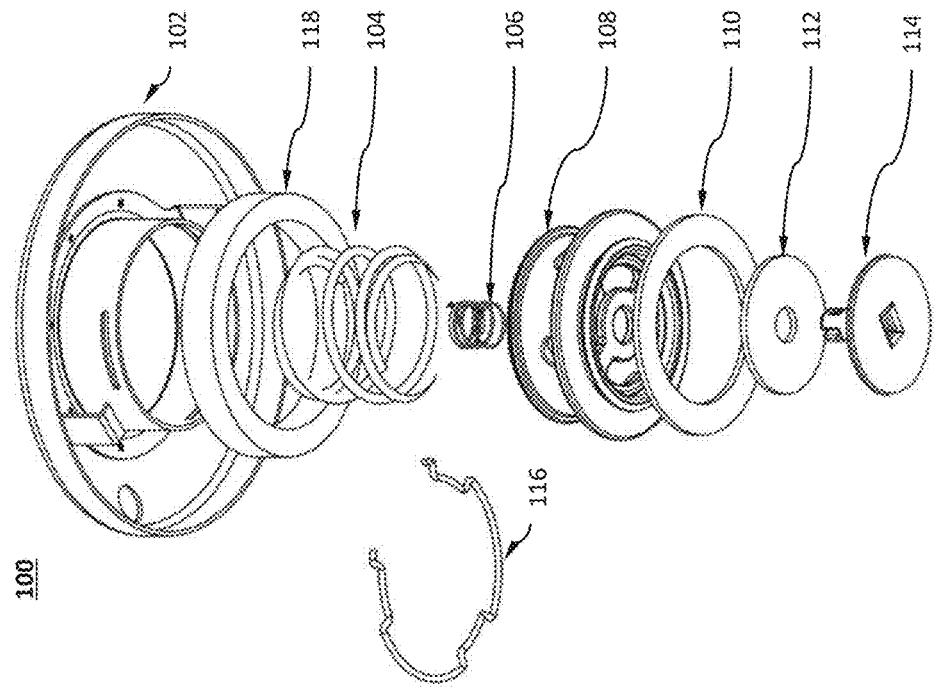
FIG. 1g illustrates an assembly view of a vented valve cap having a stability shim in accordance with an aspect of the present invention.
Figure 1E:
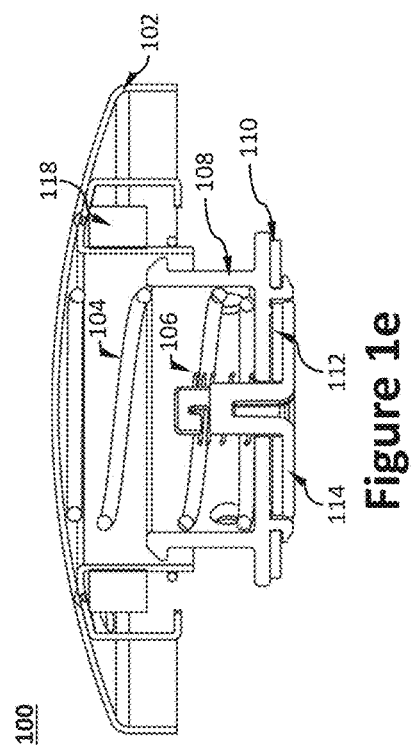
FIG. 1e illustrates a cross-sectional side view of an assembled vented valve cap having a stability shim.

To provide increased lateral stability when installed on a fill cap base, the vented valve cap 100 may further comprise a stability shim 118. FIG. 1e illustrates a cross-sectional side view of an assembled vented valve cap having a stability shim 118. The stability shim 118 may be fabricated from a fuel-resistant material (e.g., a Buna compound) having a hardness of, for example, about 50 to 90 durometer shore A, more preferably about 60 durometer shore A. As illustrated in FIG. 1e, the stability shim 118 may be installed to lay adjacent the underside surface of the cap cover 102. The inner diameter of the stability shim 118 may be sized and shaped to result in a slight stretch fit around the cap cover's 102 extruded inner cap's 102a cylindrical cap body, which is illustrated as being concentric with the cap cover 102. The cylindrical cap body may be integral with (e.g., a portion of) the inner cap 102a or a separate component coupled to the inner cap 102a. The width of the stability shim 118 may approximately the same as, or less than, the distance between the inner surface of the securing tab 202 and the outer surface of inner cap 102a (e.g., about 0.25 to 0.75 inches, more preferably about 0.35 inches). In such a configuration, the inner cap 102a (and cap cover 102) would be restricted in its movement upon installation on a fill cap base, thereby mitigating unwanted play. When installed, the stability shim 118 provides the user with a degree of resistance when turning, thereby providing the user an indication that a seal has been formed, and locking the vented valve cap 100 in place. In addition, the stability shim 118 also mitigates loosening of the cap that may result from, for example, vibration or use. Figure if illustrates a perspective view of the underside of the top assembly having a stability shim 118, with the wire-form keeper 116 engaged, while FIG. 1g illustrates an assembly view of a vented valve cap having a stability shim 118 in accordance with an aspect of the present invention. While FIG. 1e illustrates an example stability shim 118, as will be discussed below, other variations are contemplated, such as stability levers 900, wave spring stability shims, and/or formed stability shims.

FIGS. 2a through 2d and 3a through 3c illustrate the individual components and sub-assemblies of the vented valve cap 100 at various assembly stages. For illustrative purposes, the stability shim 118, which may be optional or substituted with an alternative shim or tab, is not illustrated. Specifically, FIGS. 2a through 2d illustrate the top assembly 200, while FIGS. 3a through 3c illustrate the bottom assembly 300 (e.g., a valve assembly). As will be described, the top assembly 200 generally comprises the cap cover 102 and the wire-form keeper 116, which secures the top assembly 200 to the bottom assembly 300, as illustrated in FIGS. 1c and 1d. When assembled, as will be illustrated below, the top assembly 200 slidably engages the bottom assembly 300, thereby permitting vertical movement of the cap cover's 102 bottom assembly 300 relative to the top assembly 200. The bottom assembly 300, on the other hand, may comprise the pressure spring 104, the vacuum spring 106, the valve body 108, the pressure gasket 110, the vacuum gasket 112, and the vacuum valve 114.

In lieu of a wire-form keeper 116, another form of keeper device, such as a keeper clip 120, may instead be used as illustrated in FIG. 1a. The keeper clip 120 is similar to the wire-form keeper 116 in that it comprises keeper indentations and secures the top assembly 200 to the bottom assembly 300, but differs in terms of its structure and manufacture. For example, while the wire-form keeper 116 is formed by bending a wire into a desired shape, the keeper clip 120 may be molded or stamped from, for example, a fuel-resistant material.

Figure 2B:
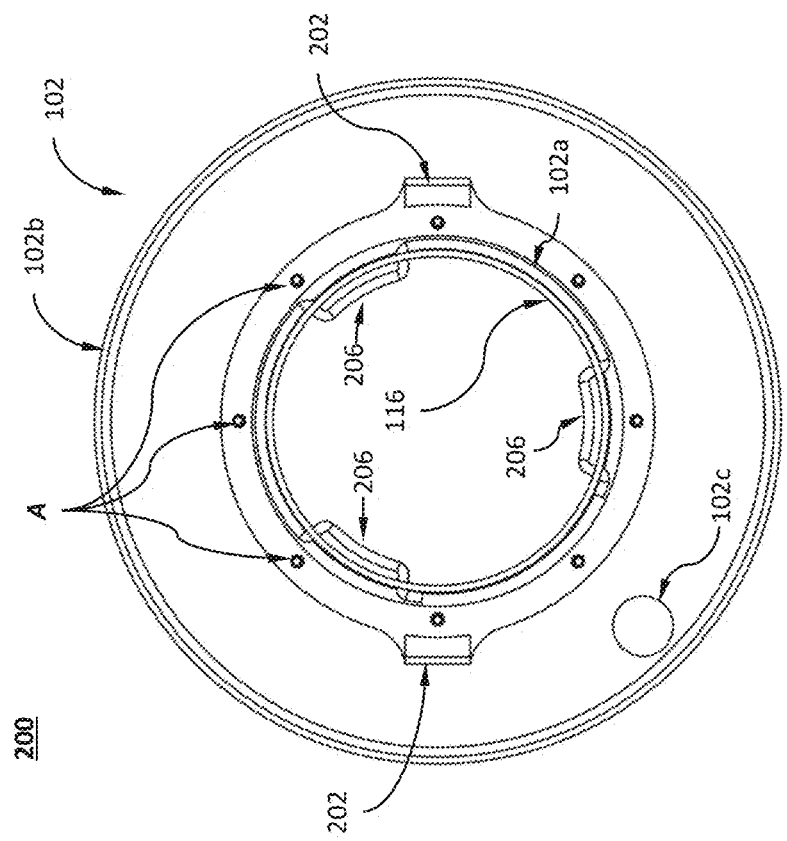
FIG. 2b illustrates a top plan view of the underside of the top assembly.
Figure 2A:
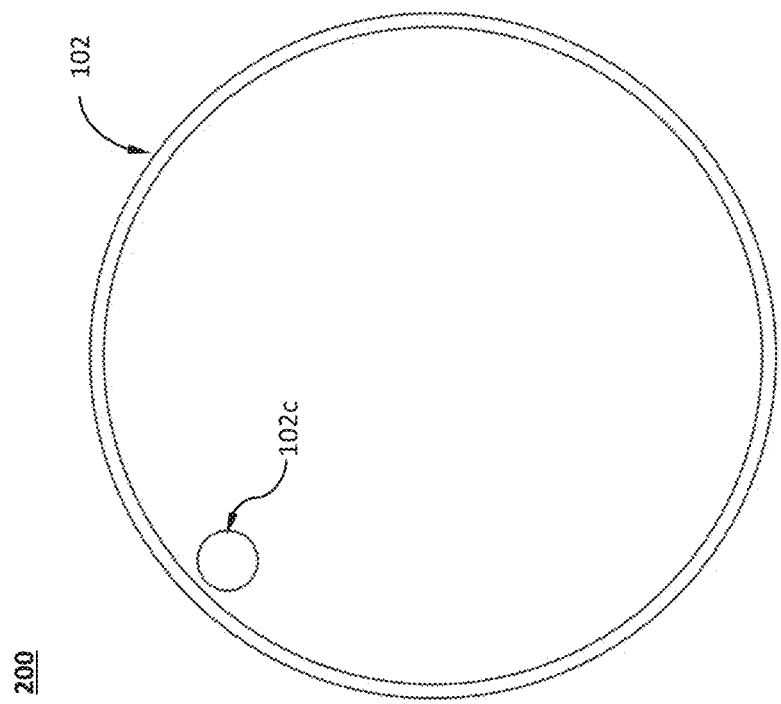
FIG. 2a illustrates a top plan view of the topside of the top assembly.

As best illustrated in FIGS. 2a through 2d, the cap cover 102 may be fabricated using an inner cap 102a and an outer cap 102b. For example, the inner cap 102a may be welded to the outer cap 102b at a plurality of locations (e.g., at the weld points A, as indicated in FIG. 2b) such that it protrudes substantially perpendicularly from the underside surface of the cap cover 102. While weld points A are illustrated, other types of fastening techniques may be used to form the cap cover 102, including, for example, alternate projection welding patterns, use of adhesives, stamping techniques, riveting techniques, or another weldment of various components. Further, the inner cap 102a and the outer cap 102b may be molded, or otherwise formed into the cap cover 102, from a single material. For instance, the cap cover 102 may be fabricated from a single material and/or as a single component using three-dimensional printing techniques. In certain aspects, the width (i.e., outer diameter) of the cap cover 102 may be, for example, about 1 to 10 inches, more preferably about 3 to 5 inches, and most preferably about 4 inches.

In certain aspects, the cap cover 102 may be fabricated from a fuel-resistant material (e.g., metal, thermoplastic, or other resin), which may be further resistant to ultraviolet (UV) light. For example, the cap cover 102 (and sub-portions) may be fabricated using ASTM A1008 DDS cold rolled carbon steel, which, as discussed below, may be further powder coated. However, the cap cover 102 may be fabricated from one or more other non-corrosive metallic materials. When a metallic material is not desirable, an example non-metallic fuel-resistant material includes, for example, BASF Ultramid 8233GHS BK 102.

In a general sense, the outer cap 102b allows for the cap cover 102 to shield the fill cap base 802 and other valve mechanisms (e.g., the bottom assembly 300) from rain, debris, and/or damage. Further, a security hole 102c may be provided in the outer cap 102b to function as a security attachment point, such as a padlock, chain, etc. The diameter of the security hole 102c may be, for example, about 0.25 to 1 inch, more preferably about 0.25 to 0.75 inch, and most preferably about 0.33 of an inch.

The inner cap 102a may comprise a cylindrical cap body and plurality of securing tabs 202 along the circumference of cylindrical cap body. The width of the inner cap's 102a cylindrical cap body may be, for example, about 1 to 8 inches, more preferably about 1.5 to 2.5 inches, and most preferably, about 2 inches. When assembled, the cylindrical cap body may perpendicularly protrude about 0.25 to 2 inches, more preferably about 0.5 to 1 inch, and most preferably about 0.75 inches from the underside surface of the cap cover 102. The width of each of the plurality of securing tabs 202 may be, for example, about 0.125 to 0.875 inches, more preferably about 0.25 to 0.75 inches, and most preferably about 0.375 to 0.5 inches.

That is, a plurality of securing tabs 202 may be provided at the outer circumference of the inner cap 102a and configured to mate with, or engage, one or more corresponding receiver components on a fill cap base 802, or otherwise lock and position the cap cover 102 to a fill cap base 802. The plurality of securing tabs 202 may be configured to substantially align to a plane defined by the distal end of the cylindrical cap body, but may be adjusted as desired to couple with a particular fill cap base. For example, as illustrated, two securing tabs 202 may be positioned on either side of the inner cap 102a and spaced 180 degrees apart. However, one of skilled in the art would understand in view of the subject disclosure that while two securing tabs 202 are illustrated, other arrangements are possible. The distant between the inner surface of a first securing tab 202 and the inner surface of a second securing tab 202 that is paced 180 degrees apart may be, for example, about 1 to 7 inches, more preferably about 2 to 4 inches, and most preferably about 2.75 inches.

A plurality of slots (e.g., 2 to 5, more preferably about 3 to 4, and most preferably 3) may be provided on the cylindrical cap body of the inner cap 102a, the plurality of slots being configured to collectively receive and/or retain the wire-form keeper 116, which secures the bottom assembly 300 to the top assembly 200. Thus, as illustrated, each of said plurality of slots may receive at least a portion of the wire-form keeper 116. Specifically, each slot 204 may receive a keeper indentation 206 (e.g., an inwardly bent notch segment on said wire-form keeper 116). Thus, installation may be accomplished by spreading the wire-form keeper 116 over the cylindrical cap body of the inner cap 102a; such that each keeper indentation 206 is positioned/inserted into a slot 204. The wire-form keeper 116 may be fabricated from a corrosion-resistant material, such as 15-16 gauge 302 stainless steel. As illustrated, the keeper indentations 206 may be configured and sized to fit at least partially within slots 204.

To provide adequate protection throughout the service life of the vented valve cap 100, the cap cover 102, as well as the other components of the vented valve cap 100, may be painted, powder coated, or otherwise coated with a protective material. Suitable powder coating materials include those available from Akzo Nobel Interpon, such as Akzo Nobel Interpon 600 product series, which is a polyester-based powder coating for exterior environments that offers light and weather resistance. To simulate the appearance of caps that are currently available in the market, which often have a metal cap with yellow zinc chromate coating, a "soft gold" powder coat color may be chosen.

FIGS. 3a through 3c illustrate the bottom assembly 300. As illustrated, the bottom assembly 300 employs a pressure spring 104 and a vacuum spring 106 to facilitate venting of the vented valve cap 100. The pressure spring 104 may be fabricated from a corrosion-resistant material, such as 13 gauge 302 stainless steel wire. The diameter of the pressure spring's 104 coil may be maximized with regard to the inside diameter of the valve body 108, thereby allowing maximum stability (e.g., via a larger footprint) and consistency in pressure venting. The diameter of the pressure spring's 104 coil may be, for example, about 1 to 5 inches, more preferably about 1 to 2 inches, and most preferably about 1.5 inches, while the vacuum spring's 106 coil may be, for example, about 0.25 to 1 inches, more preferably about 0.33 to 0.67 inches, and most preferably about 0.5 inches. The pressure spring 104 may reside at least partially within each of the cylindrical valve body portion 608 of valve body 108 and the cylindrical cap body of the inner cap 102a. The pressure spring 104 is configured to impart a force that biases the bottom assembly 300 away from said top assembly 200.

The compression rate (i.e., spring constant) of the spring at installed height, in conjunction with the physical design of the other components, dictates the pressure at which the vented valve cap 100 vents pressure. The compression rate also allows the venting mechanism to properly function in instances when the cap is not properly installed on the fill cap base 802, thereby permitting for some fit deviation. The distal ends of the pressure spring 104 may be turned in toward the center of the coil so that potentially sharp ends do not hinder the ability of adjacent components to turn relative to one another upon installation on the fill cap base 802. The compression spring ends (e.g., pressure spring 104 and vacuum spring 106) may be configured such that they allow for minimal friction against the cap cover 102 and against valve body 108 when rotated. This is notable because the pressure gasket 110 and valve body 108 assemblies should not rotate relative to the fill cap base 802 when installed. The vacuum spring 106 may be similarly fabricated from a corrosion-resistant material, such as 302 stainless steel. The compression rate of the vacuum spring 106 at installed height, in conjunction with the physical design of the other components, dictates the point at which vacuum is relieved (i.e., the point at which the vacuum valve 114 extends into the tank so as to draw in compensation air). The compression rate of the vacuum spring 106 may be chosen to ensure that an adequate seal is present when there is virtually zero pressure in the tank, thereby preventing fuel vapors from escaping to the atmosphere.

One of skill in the art would appreciate that the compression rate of the pressure spring 104 and/or vacuum spring 106 may be adjusted to vent a given tank at a desired pressure (or vacuum). For example, to permit a higher pressure within the tank, the spring constant of the pressure spring 104 may be increased, while the tank may be limited to a lower pressure by decreasing the spring constant of the pressure spring 104. Similarly, to permit a higher vacuum (negative pressure) within the tank, the spring constant of the vacuum spring 106 may be increased, while the tank may be limited to a lower vacuum by decreasing the spring constant of the vacuum spring 106.

Figure 4B:
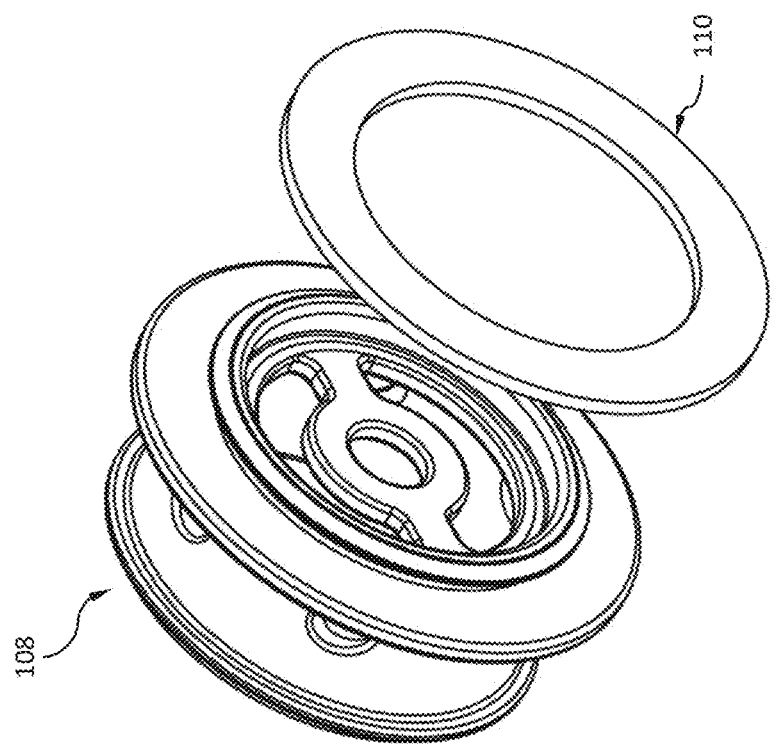
FIG. 4b illustrates a perspective view of the valve body and pressure gasket of the bottom assembly.
Figure 4A:
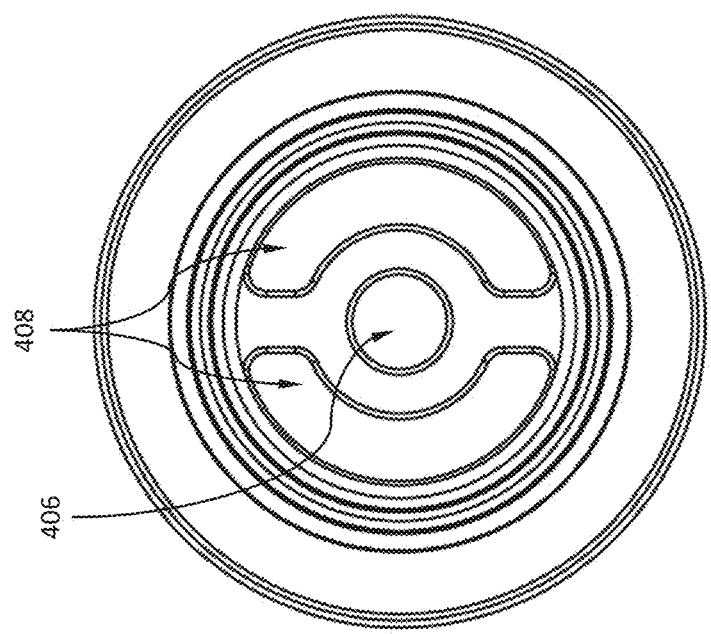
FIG. 4a illustrates a top plan view of the topside of a valve body of the bottom assembly.

A detailed view of the valve body 108 is illustrated in FIGS. 4a and 4b. The valve body 108, as well as the vacuum valve 114 (discussed below), may be fabricated from a fuel-resistant material (e.g., thermoplastic, or other resin), which may be further resistant to ultraviolet (UV) light. A suitable fuel-resistant material includes, for example, BASF Ultramid 8233GHS BK 102. As noted above, the same material may also be used to fabricate the cap cover 102, but the various structural components of the vented valve cap 100 need not be fabricated from the same materials.

The valve body 108 may comprise a cylindrical valve body portion 608 having a plurality of vent holes 604, and a valve base 606 positioned at a first end of the cylindrical valve body portion 608, and a rib 602 positioned at the second end. In certain aspects, the valve body 108 may be sized and shaped to define the cylindrical valve body portion 608. The outer diameter of the valve body's 108 cylindrical valve body portion 608 may be, for example, about 0.5 to 3 inches, more preferably about 1.0 to 2.0 inches, and most preferably about 1.66 inches.

Figure 6B:
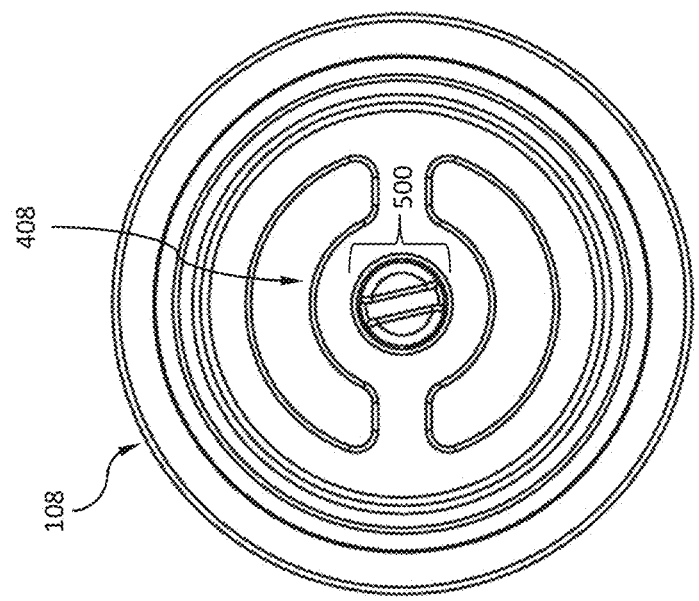
FIG. 6b illustrates a top plan view of the valve body with the vacuum valve installed.
Figure 6A:
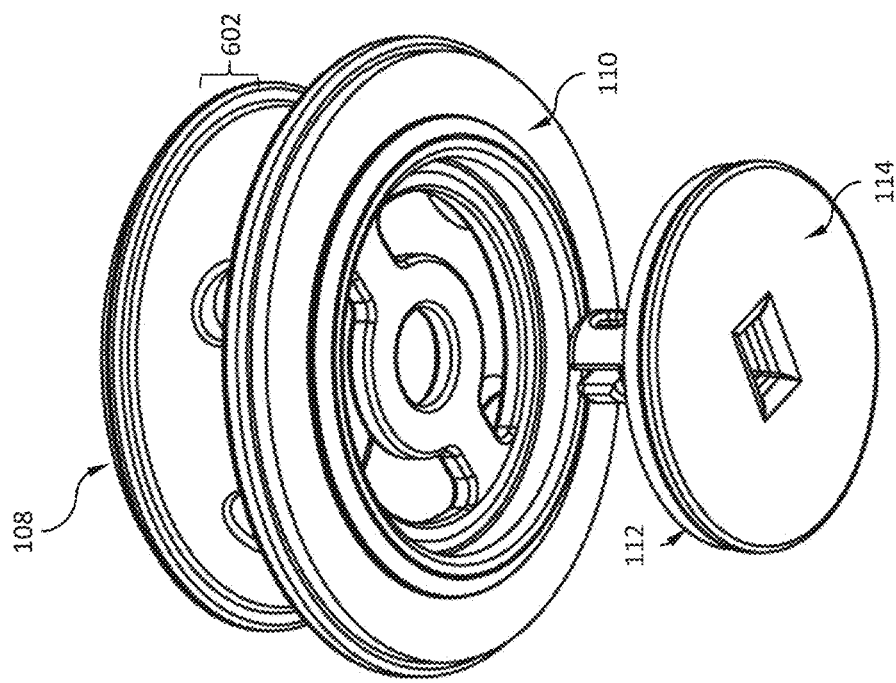
FIG. 6a illustrates a perspective view of the valve body and vacuum valve.

As illustrated, a through hole 406 may be positioned at the center of the valve base 606 of the valve body 108 to allow the vacuum stem 502 of the vacuum valve 114 to protrude through the valve base 606 to the other side, thereby allowing assembly of the vacuum valve 114 to the valve body 108 via the vacuum spring 106 (as illustrated in FIG. 6a). The through hole 406 may be slip fit with regard to the vacuum stem 502 of the vacuum valve 114 so as to mitigate unwanted lateral movement, while permitting vertical movement (e.g., when venting).

As illustrated in FIGS. 5a through 5c, vacuum valve 114 generally comprises a vacuum base (e.g., disk-shaped base 508) and a vacuum stem 502 perpendicularly positioned at the center of said disk-shaped base 508. The vacuum base is moveable between a first position and a second position, wherein the vacuum base prevents flow through the half-moon shaped vent slots 408 in the first position and permits flow through the half-moon shaped vent slots 408 in the second position, the vacuum base being biased in the first position by a vacuum spring 106.

The disk-shaped base 508 may have a diameter of about 0.5 to 3 inches, more preferably about 1 to 2 inches, and most preferably about 1.33 inches, while the vacuum stem 502 may have a diameter of about 0.25 to 1 inches, more preferably about 0.25 to 0.5 inches, and most preferably about 0.33 inches. When assembled, the vacuum gasket 112 slips over the vacuum stem 502, which functions as a spring support, to lay flush against the top surface of the disk-shaped base 508. To mitigate unwanted movement, the inner diameter of the vacuum gasket 112 may be slip fit to the vacuum stem 502 on the vacuum valve 114, with an outer diameter about equal to that of the disk-shaped base 508. The pressure gasket 110 and vacuum gasket 112 are configured to interact with their mating parts and sealing surfaces. Each of said pressure gasket 110 and vacuum gasket 112 may be fabricated from a fuel-resistant flexible material. Examples of fuel resistant materials include fuel-resistant Nitrile rubber (also known as buna rubber), fluoroelastomer materials (e.g., a viton compound), etc. The fuel-resistant flexible material's hardness may be, for example, about 50 to 100 durometer shore A, more preferably about 70 durometer shore A.

As noted above and illustrated in FIGS. 6a through 6d, a rib 602 may be positioned at the top edge (e.g., a second end) of the valve body 108, on the body's cylindrical cap body's outside diameter. The rib 602 may be sized such that it interferes with the wire-form keeper 116 (when installed), thus allowing the top assembly 200 and the bottom assembly 300 to remain assembled while the pressure spring 104 is in a constant state of compression. In other words, the rib 602 may push past the wire-form keeper's 116 contact points, enabling snap together assembly. Similarly, the top assembly 200 may be removable from the bottom assembly 300 without requiring dismantling of the vented valve cap 100 or resulting in damage to the vented valve cap 100. For example, the top assembly 200 may be pulled away from the bottom assembly 300 until the rib 602 pushes past the wire-form keeper's 116 contact points. The diameter of the rib 602 may be, for example, about 0.55 to 3.5 inches, more preferably about 1.1 to 2.2 inches, most preferably, about 1.85 inches, while the diameter of the valve base 606 may be, for example, about 1.0 to 4.0 inches, more preferably about 1.5 to 2.5 inches, most preferably, about 2.1 inches. As best illustrated in FIG. 6d, the disk-shaped base 508 and the valve base 606 are arranged substantially concentric and parallel to one another, the disk-shaped base 508 being moveable between a first position and a second position.

The rib's 602 geometry allows for the wire-form keeper 116, when installed on a cap cover 102, to be pushed onto the valve body 108 easily. This aids in assembly by allowing the wire-form keeper 116 to be preinstalled on the inner cap 102a of the cap cover 102. In operation, the valve body 108 and the cap cover 102 may be pushed together, expanding the wire-form keeper 116 as it travels over the rib 602 then allowing it to contract around the main valve body's 108 cylindrical valve body portion 608 (just under the rib 602), yielding a fully assembled vented valve cap 100. More specifically, in order to assemble the vented valve cap 100, as best illustrated in FIG. 1c, the user need only apply sufficient force to override the pressure spring's 104 force, which allows the angular surface of the valve body's 108 rib 602 to deflect the wire-form keeper 116, and lock the bottom assembly 300 and top assembly 200 into assembled vented valve cap 100. As illustrated, the three-point contact of the wire-form keeper 116 allows the bottom assembly 300 to rotate freely.

As illustrated, a plurality of vent holes 604 may be provided through the outside of the valve body 108 to allow the passage/transfer of gas (e.g., air) when there is a significant vacuum in the tank, and significant compensatory air is required. The cumulative area of the vent holes 604 may exceed the cumulative area of half-moon shaped vent slots 408 (serving as a vent hole) on the valve base 606 of the valve body 108 so as to maximize vent flow through the vented valve cap 100. Each of the plurality of vent holes 604 (e.g., as illustrated, 6 vent holes 604) may have a diameter of, for example, about 0.1 to 0.5 inches, more preferably about 0.225 inches (i.e., about 0.96 square inches). The diameter of the holes may be adjusted based upon the number of vent holes 604. That is, if fewer vent holes 604 are provided, the diameter of each vent hole 604 may be increased to allow for a commensurate amount of air flow. Conversely, if a greater number of vent holes 604 are provided, the diameter of each vent hole 604 may be decreased.

The cumulative area of these half-moon shaped vent slots 408 has been maximized to allow a maximum volume of air to flow through the valve body 108, while maintaining roughly 7.3 inches of water of vacuum in the tank under maximum fluid withdrawal conditions. A small circular ridge 610 may be provided on the valve base 606 of the valve body 108 to provide an increased seal with the vacuum gasket 112. The small circular ridge 610 may be about 1.2 inches in diameter (e.g., when used with a vented fill cap configured to couple with a 2 inch bunghole) and centered on the through hole 406 in the center of the valve body's 108 valve base 606. By using a small circular ridge 610 in this configuration, the force per square unit of area at the point of contact between the vacuum gasket 112 and the valve body 108 is increased by minimizing the point of contact's surface area. Thus, such a ridge feature and radius improves poor seal integrity associated with a low compression spring rote used in vacuum relief function. In certain aspects, additional ribs may be provided at the other seal points. For example, a small circular ridge (or the like) may be provided on the valve body 108 between the underside of the valve body 108 and the pressure gasket 110.

As illustrated in FIG. 6d, for example, a circular protrusion 612 (e.g., a protruding ring axially center with the vented valve cap 100 and valve body 108) may protrude from the valve base 606 of the valve body 108. The circular protrusion 612 may be provided with an undercut to allow for installation of the pressure gasket 110. The circular protrusion 612 may have an outer diameter of about 0.6 to 3.2 inches, more preferably about 1 to 2 inches, most preferably, about 1.6 inches, and an inner diameter of about 0.5 to 3.0 inches, more preferably about 1 to 2 inches, most preferably, about 1.33 inches. As illustrated, the pressure gasket's 110 inside diameter may be smaller than the outside diameter of the circular protrusion's 612 undercut area 614. During assembly, the pressure gasket 110 may be stretched around the outside diameter of this circular protrusion 612 and into the undercut area 614. Thus, when installed, the pressure gasket 110 may be captured between two surfaces of the valve body 108. The chamfer on the surface of the circular protrusion 612 may be further configured (e.g., angled) to aid in this assembly process.

Figure 7A:
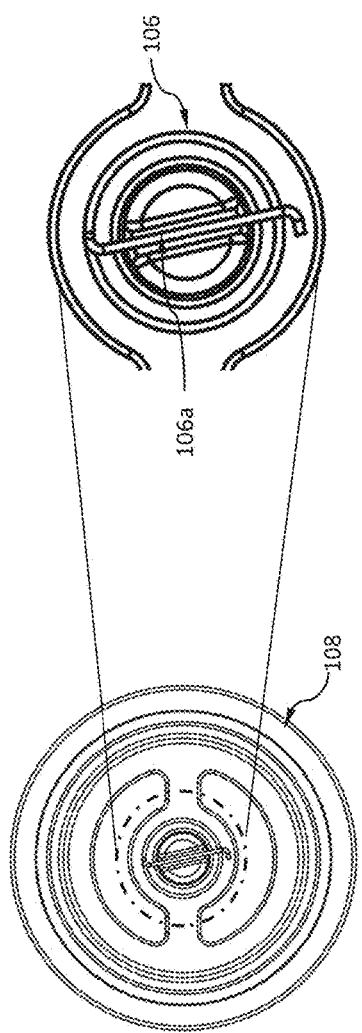
FIG. 7a illustrates a top plan view of the valve body with the vacuum valve and vacuum spring installed.
Figure 7B:
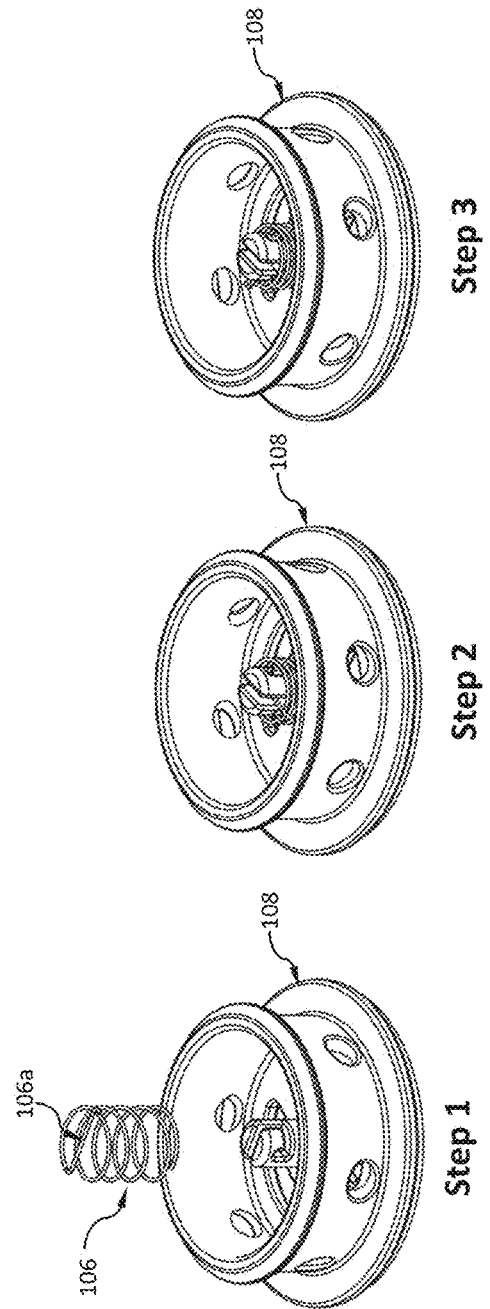
FIG. 7b illustrates an exemplary process by which a vacuum spring may be installed in the bottom assembly.

As illustrated in FIGS. 7a and 7b, the distal end 500 of the vacuum stem 502 may be configured to accept the torsional end 106a of the vacuum spring 106. Indeed, the vacuum spring 106 may be provided with a torsional end 106a to allow for a simple "push and turn" assembly of the vacuum spring 106 to the vacuum valve 114. Further, a small kick 600 may be provided at the distal end 500 of the vacuum stem 502 to ensure that the torsional end 106a of the vacuum spring 106 does not disengage from the vacuum valve 114 through irregular use or handling. In operation, as best illustrated in FIG. 7b, a flat portion of the vacuum spring's 106 torsional end 106a may be inserted at step 1 into a slit 506 at the end of the vacuum stem 502, upon insertion, at step 2, the vacuum spring 106 may be compressed and rotated (e.g., 90 degrees, or a "quarter-turn" installation) such that, at step 3, the flat end of the vacuum spring 106 is received, and substantially secured (e.g., via a force imparted by said vacuum spring 106), within a notch 506 at the distal end 500 of the vacuum stem 502. A spur may be included on torsional end 106a to maintain the vacuum spring's 106 position during operation (e.g., when fully compressed). In certain aspects, however, an e-clip 702 may be provided at the distal end 500 of the vacuum stem 502 to secure the vacuum spring 106. FIGS. 7c and 7d illustrate an exemplary arrangement for securing the vacuum spring 106 using an e-clip 702. Thus, the distal end 500 of the vacuum stem 502 may alternatively employ a groove 704 sized and shaped to receive the e-clip 702 (e.g., above the end of the vacuum spring 106), as best illustrated in FIG. 7*d*. In such an arrangement, the vacuum spring 106 need not employ a torsional end.

Figure 8A:
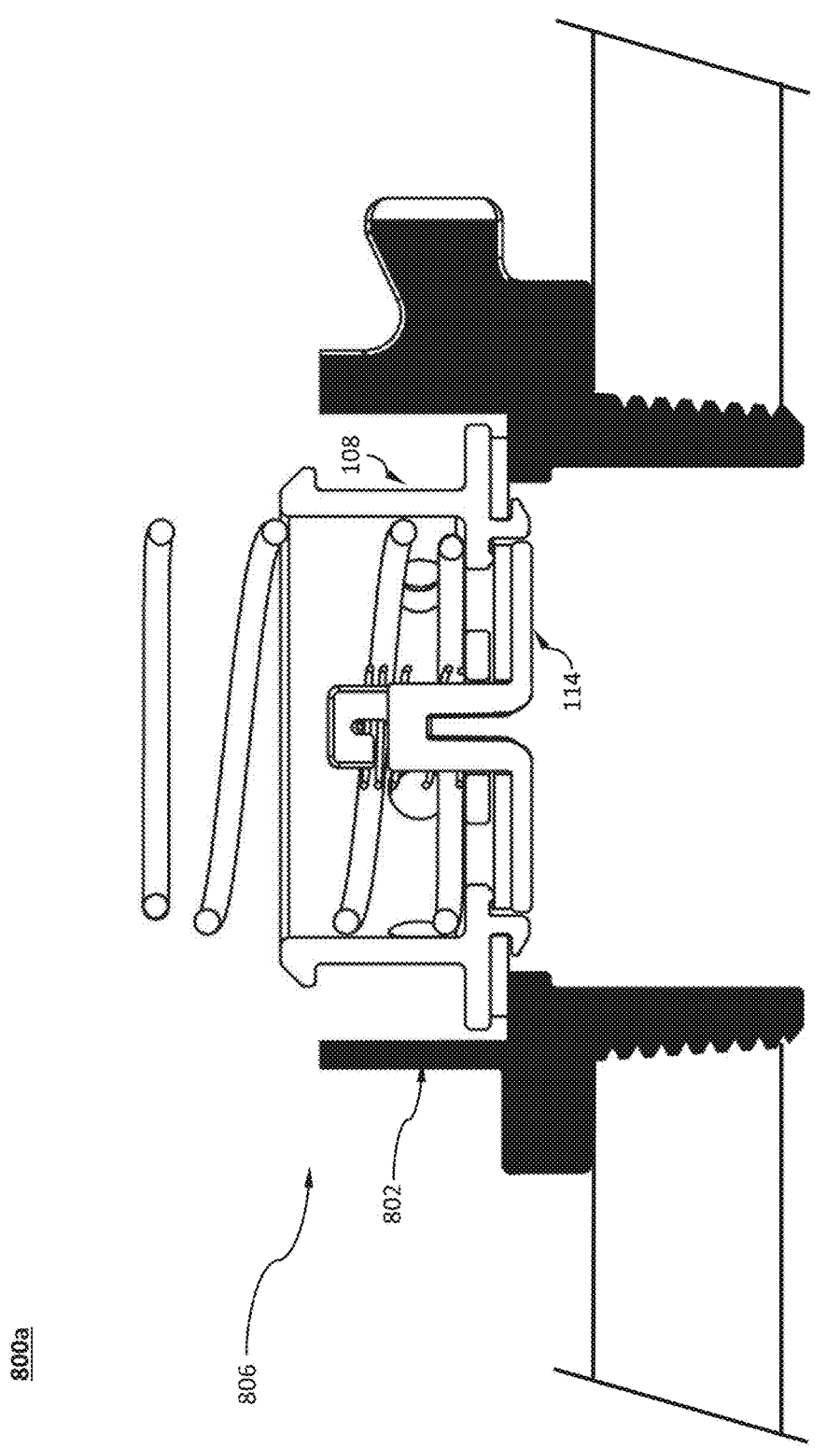
FIG. 8a illustrates a vented valve cap coupled to a tank under pressure equalization.
Figure 8B:
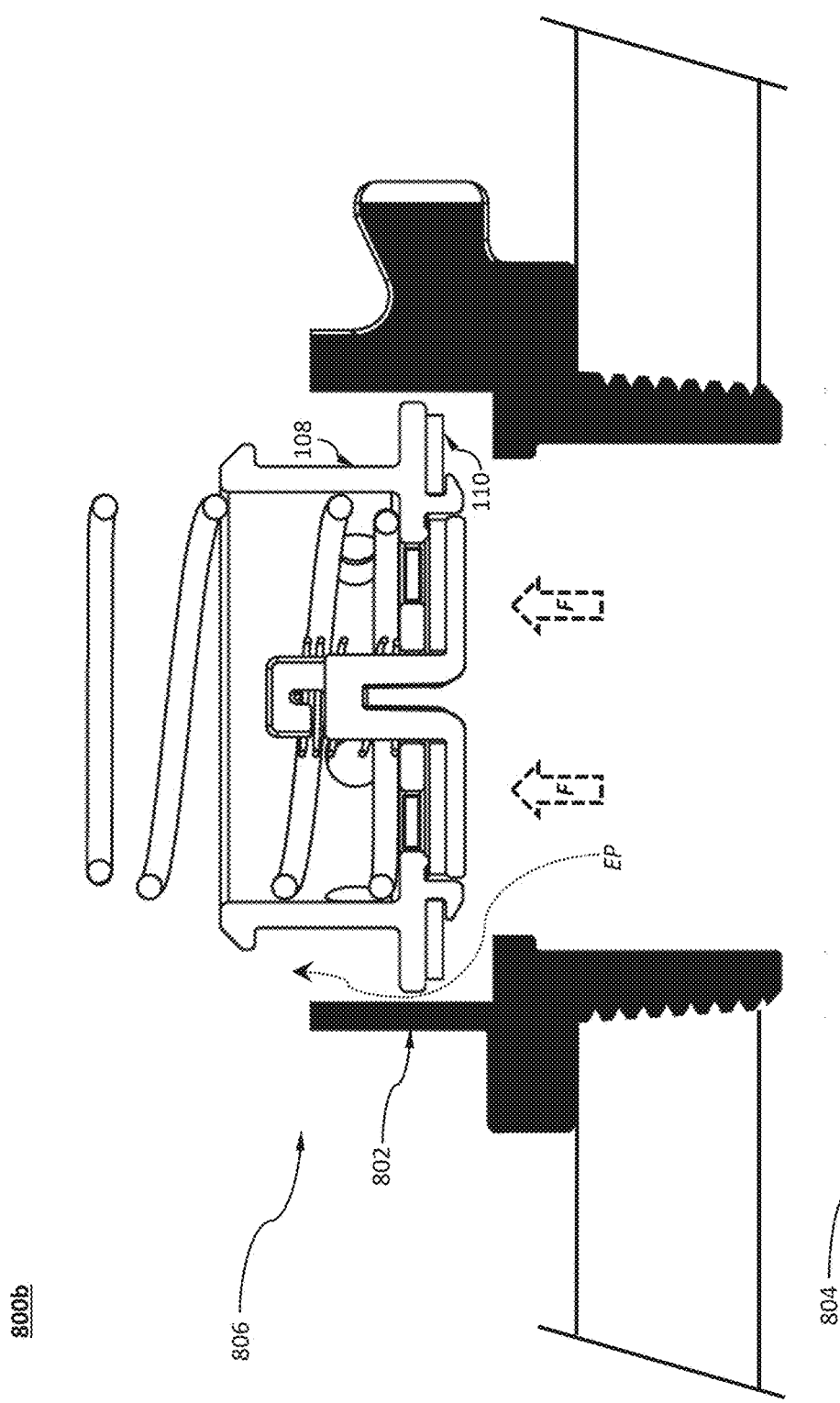
FIG. 8b illustrates a vented valve cap coupled to a tank having a positive pressure.
Figure 8C:
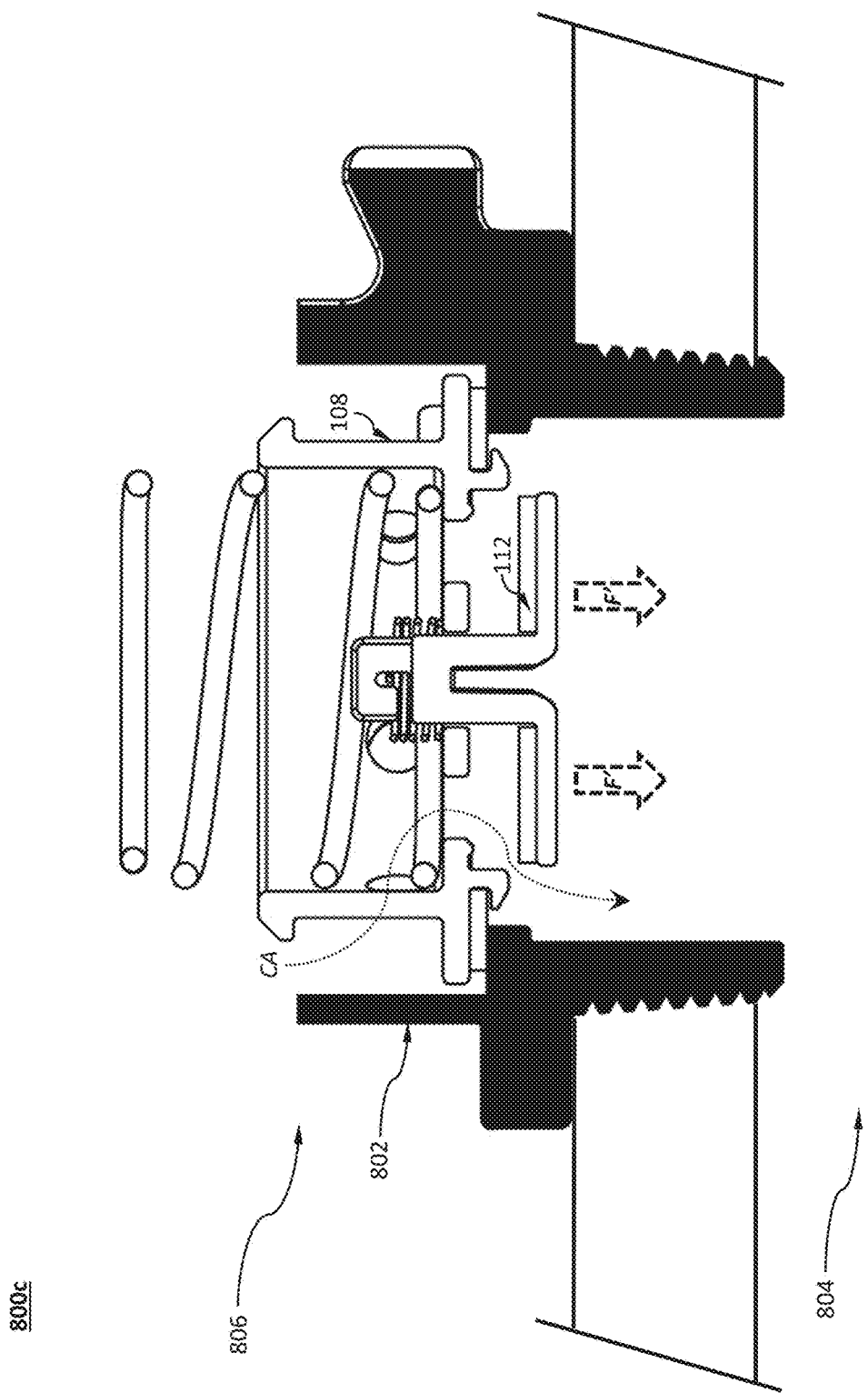
FIG. 8c illustrates a vented valve cap coupled to a tank having a negative pressure (vacuum).

FIGS. 8*a*, 8*b*, and 8*c* illustrate an example of a vented valve cap 100 coupled to a tank 804 under three exemplary pressure conditions. For clarity, the cap cover 102 of the vented valve cap 100, which would couple to the fill cap base 802, has been omitted from the figures so as to avoid visual obstruction of the other components. Further, as illustrated, and as explained above, the vented valve cap 100 may couple to the tank 804 via a fill cap base 802 that couples the vented valve cap 100 to a bunghole in the tank 804. In certain aspects, such as when removable cap functionality is not needed, the vented valve cap 100 and the fill cap base 802 may be constructed as a single component to provide venting functionality to a given tank. In such a situation, for example, the cap cover 102 may be fixedly and nonremovably coupled with the fill cap base 802. Finally, in certain aspects, the fill cap base 802 and the tank 804 may be provided as a single apparatus (e.g., the fill cap base's 802 cap attachment elements may be formed as part of, or welded to, the tank 804).

The wire-form keeper 116, valve body 108, pressure spring 104 and cap cover 102 may be configured to allow free rotation of the assembly upon installation to a fill cap base 802. When installed upon a fill cap base 802, the cap cover 102 is pressed into position (e.g., downward, or toward the tank), which compresses the pressure spring 104. This allows the securing tabs 202 on the cap cover 102 to move past corresponding protrusions on the fill cap base 802. Once the securing tabs 202 are past these protrusions, the cap cover 102 can be rotated (e.g., clockwise) into its appropriate position. When rotating the cap cover 102, it is preferable to require minimal resistance within the assembly to make installation easy. However, other means of attaching the cap cover 102 to the fill cap base 802 are possible. For example, the cap cover 102 may be at least partially threaded and configured to couple with corresponding threading on the fill cap base 802. In such an embodiment, holes may be provided through the threaded portion on the cap cover 102 to facilitate venting, or, in the alternative, gaps may be provided between threaded tabs on the cap cover 102.

The vented valve cap 100 of FIG. 8*a* is illustrated as being coupled to a tank 804 under pressure equalization. That is, having zero gauge pressure between the atmosphere 806 and the pressure within the tank 804. As illustrated, because pressure equalization exists between atmosphere 806 and the tank 804, the vacuum valve 114 with vacuum gasket 112 installed is held against the underside of the valve body 108 by the vacuum spring 106. The vacuum spring 106 may be retained on the vacuum valve 114 by its torsional end 106*a* and the mating feature on the vacuum valve 114. The vacuum spring 106 may be configured with a compression rating such that the vacuum spring 106 provides sufficient force to form a seal in the assembly when there is no vacuum or pressure present, but allows for the seal to break in the presence of minimal vacuum. The valve body 108, with pressure gasket 110 installed, is held against a top surface of the fill cap base 802 by the pressure spring 104. The pressure spring 104, upon installation on the fill cap base 802, is compressed by the cap cover 102 adequately to form a seal of up to, for example, 1.25-1.5 psig in the tank.

FIG. 8*b* illustrates the vented valve cap 100 as being coupled to a tank 804 having a positive gauge pressure within the tank 804 (with reference to the atmosphere 806). For example, the positive gauge pressure may be, for example, 1.25-1.5 psig, which causes the vented valve cap 100 to vent the excess gas from the tank 804. More specifically, the force (direction F) of the pressure in the tank 804 is exerted upon the underside of the vacuum valve 114, valve body 108, and surface area of the pressure gasket 110 within the opening of fill cap base 802. In this state, the pressure spring 104 compresses, thereby breaking the seal between the fill cap base 802 and the pressure gasket 110. Upon relief of excess pressure (indicated in the figure as EP) in the tank 804, the pressure spring 104 extends and substantially reforms the seal between the pressure gasket 110 and the fill cap base 802. Upon pressure equalization between atmosphere 806 and the tank 804 (or achieving a predetermined targeted tank pressure/vacuum), the vacuum spring 106 extends and reforms the seal between the vacuum gasket 112 and the valve body 108 (as illustrated in FIG. 8*a*). That is, after pressure equalization between atmosphere and the tank, the vacuum spring 106 may extend and reseal at a targeted pressure above 0 psig. For example, after venting, 0.8 psig may remain in the tank relative to the atmosphere. This operation prevents the tank 804 from venting to open atmosphere 806 until a sufficient pressure is again achieved. Thus, the point in which the vented valve cap 100 is sealed in each direction may be dictated by the spring ratings of the pressure spring 104 and vacuum spring 106, which in turn are guided by the desired (e.g., targeted) tank pressure/vacuum, which need not be 0 psig relative to the atmosphere.

FIG. 8*c* illustrates the vented valve cap 100 as being coupled to a tank 804 having a negative gauge pressure (i.e., a vacuum) within the tank 804 (with reference to the atmosphere 806). For example, the negative gauge pressure may be, for example, −0.08 psig, which causes the vented valve cap 100 to vent or draw atmospheric air from the atmosphere 806 into the tank 804. Indeed, a nominal gauge pressure from the atmosphere 806 working against the vacuum valve 114 (direction F) causes the vacuum spring 106 to compress, thereby breaking the seal between the vacuum gasket 112 and the valve body 108. This operation allows for compensatory air (indicated in the figure as CA) from the atmosphere 806 to enter the tank 804 to equalize the pressure. Upon pressure equalization between atmosphere 806 and the tank 804 (or achieving a predetermined targeted tank pressure/vacuum), the vacuum spring 106 extends and substantially reforms the seal between the vacuum gasket 112 and the valve body 108 (as illustrated in FIG. 8*a*). A maximum "flow rating," which relates to the maximum amount of volume to be removed from the tank 804 in a given period of time, may be, for example, 30 GPM or more. Because the half-moon shaped vent slots 408 maximize the available air flow, the vented valve cap may facilitate a flow that is much higher than 30 GPM. Thus, the vented valve cap 100 can facilitate higher flow rates vis-à-vis existing fill caps.

Figure 1F:
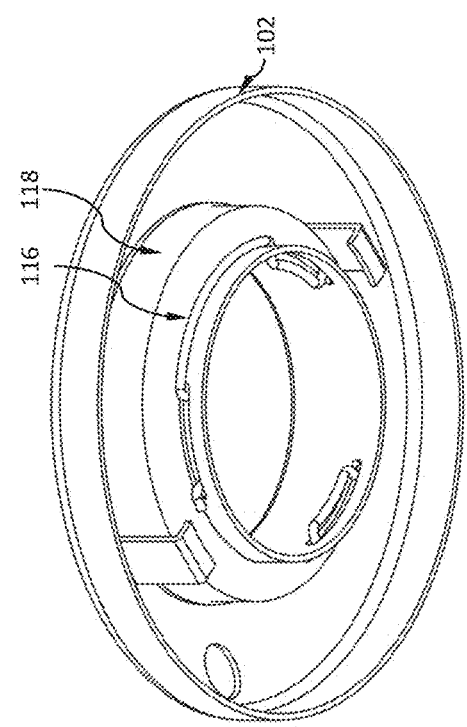
FIG. 1f illustrates a perspective view of the underside of the top assembly having a stability shim, with the wire-form keeper engaged.
Figure 9B:
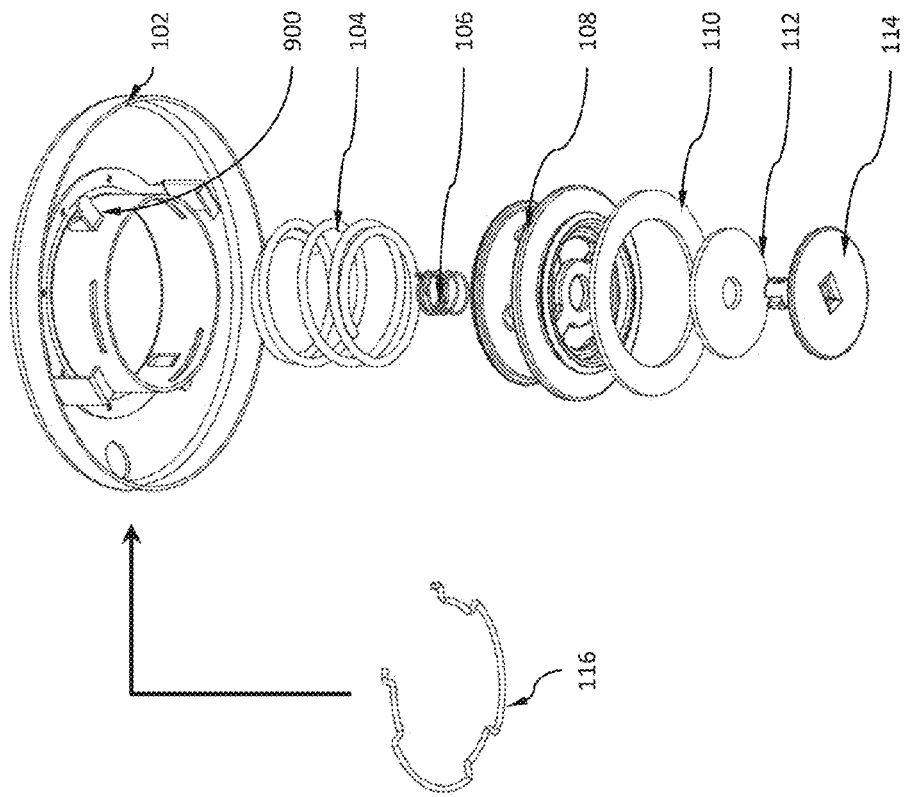
FIG. 9b illustrates an example assembly view of a vented valve cap having an inner cap having a stability lever.
Figure 9A:
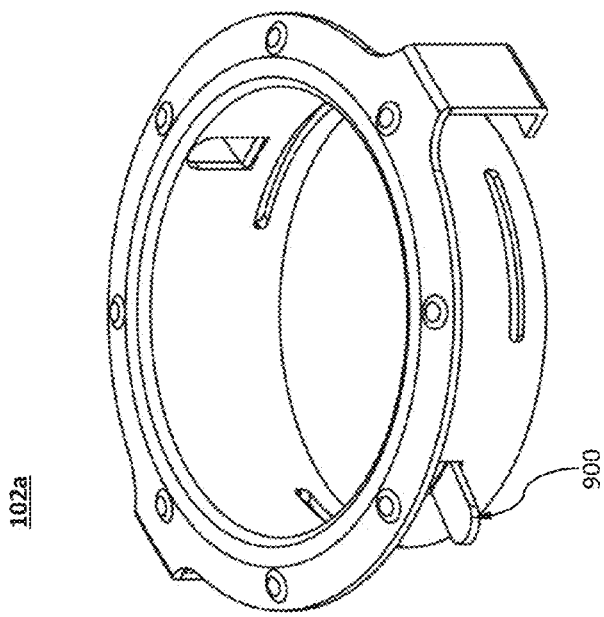
FIG. 9a illustrates an inner cap having a stability lever.
Figure 9D:
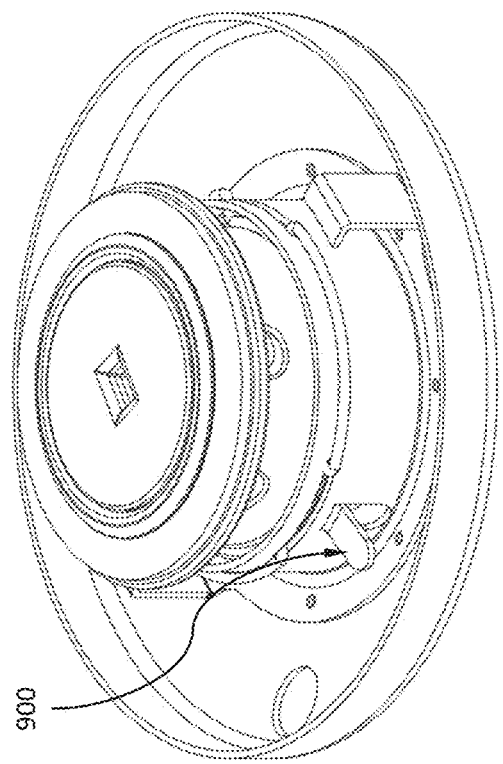
FIGS. 9c and 9d illustrate perspective views of the vented valve cap of FIG. 9b.
Figure 9C:
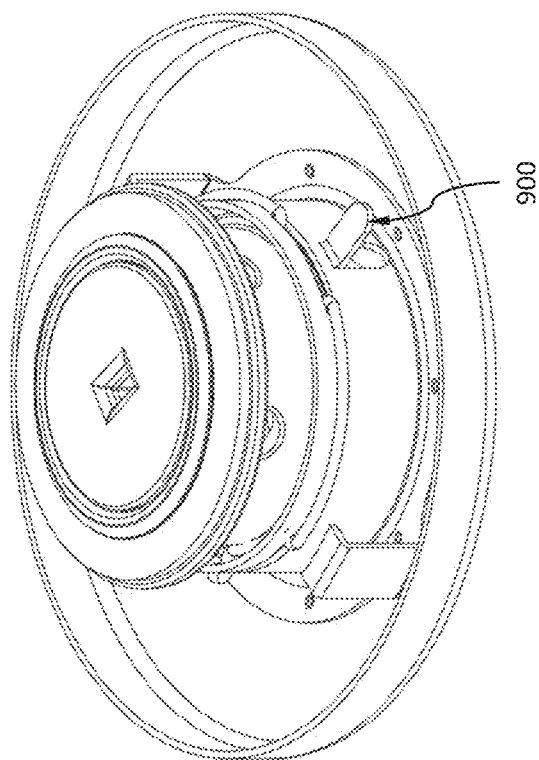
Figure 10B:
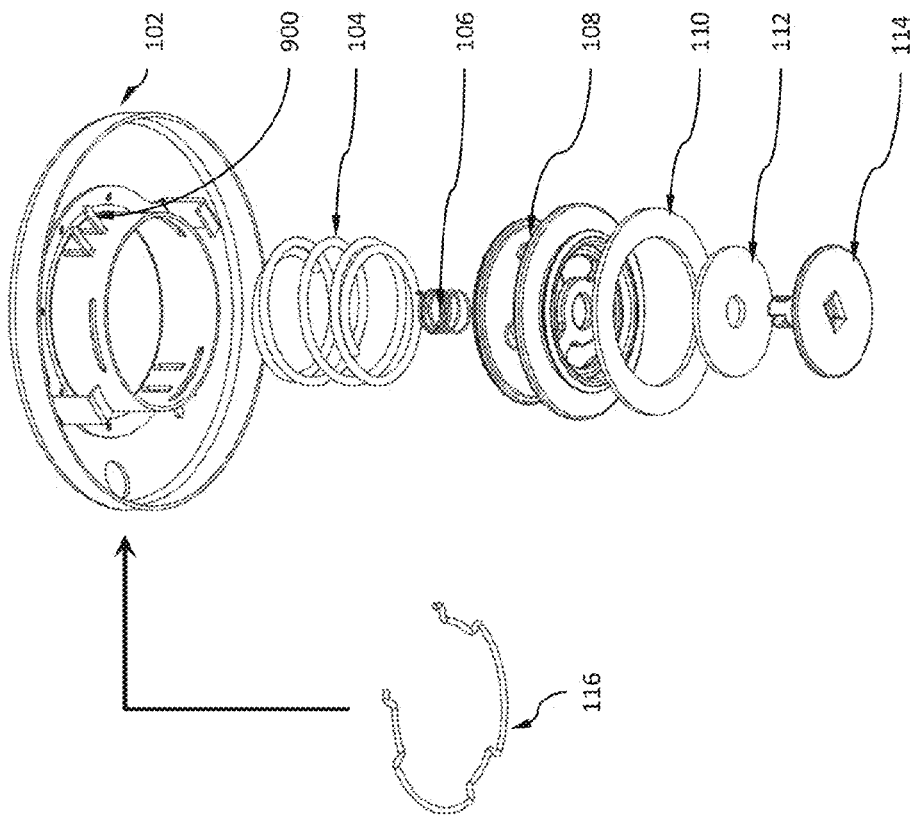
FIG. 10b illustrates an example assembly view of a vented valve cap having an inner cap having a set of stability levers.
Figure 10A:
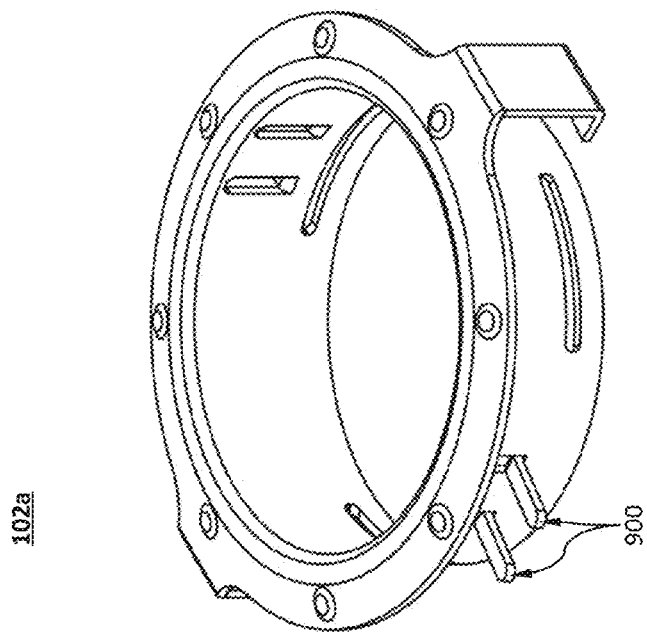
FIG. 10a illustrates an inner cap having a set of stability levers.
Figure 10D:
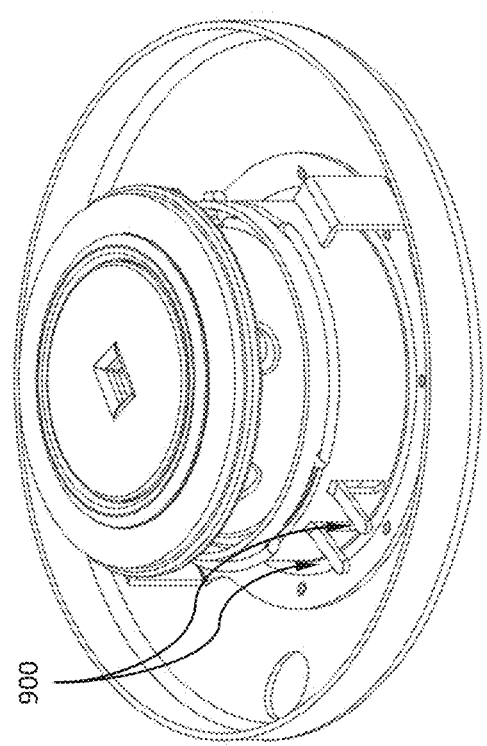
FIGS. 10c and 10d illustrate perspective views of the vented valve cap of FIG. 10b.
Figure 10C:
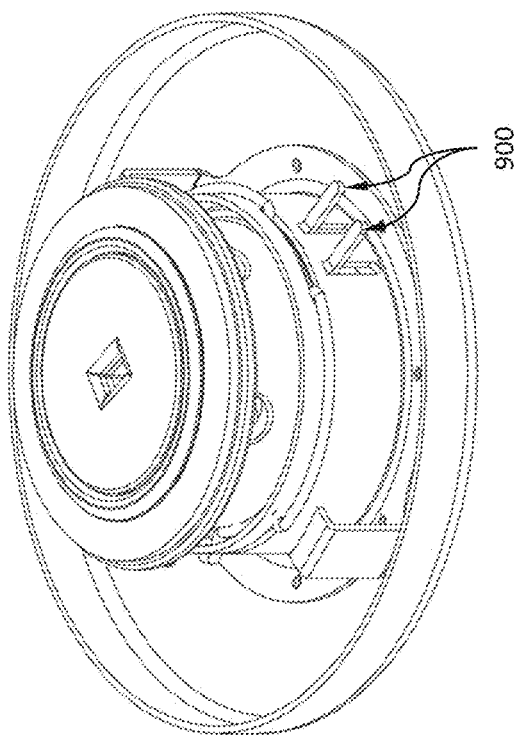

FIG. 9*a* illustrates an inner cap 102*a* employing a stability lever 900, which may be used as a first alternative to stability shim 118 of FIGS. 1*e* through 1*g*. FIG. 9*b* illustrates an example assembly view of a vented valve cap having an inner cap 102*a* having a stability lever 900, while FIGS. 9*c* and 9*d* illustrate perspective views of the vented valve cap of FIG. 9*b*. As illustrated, a plurality of stability levers 900 may be used to provide increased lateral stability when installed on a fill cap base 802. The outwardly oriented plurality of stability levers 900 may be spaced around the circumference of the inner cap 102*a*. For example, one stability lever 900 may be positioned opposite another stability lever 900, as illustrated in Figured 9*a*, although additional stability levers 900 may be used. For example, 3 to 6 stability levers 900 may be distributed around the circumference of the inner cap 102a. The stability lever 900 may be stamped from the same material used to form the inner cap 102a and the tab portion bent outward or, in the alternative, a piece of material may be fused or otherwise coupled to the outer surface of the inner cap 102a through, for example, alternate projection welding patterns, use of adhesives, stamping techniques, riveting techniques, or another weldment of various components. In certain aspects, a set of stability levers 900 may be provided at each location. Such an arrangement is illustrated in FIGS. 10a through 10d. Specifically, FIG. 10a illustrates an inner cap 102a having a set of stability levers. FIG. 10b illustrates an example assembly view of a vented valve cap having an inner cap 102a having a set of stability levers 900, while FIGS. 10c and 10d illustrate perspective views of the vented valve cap of FIG. 10b.

Figure 11D:
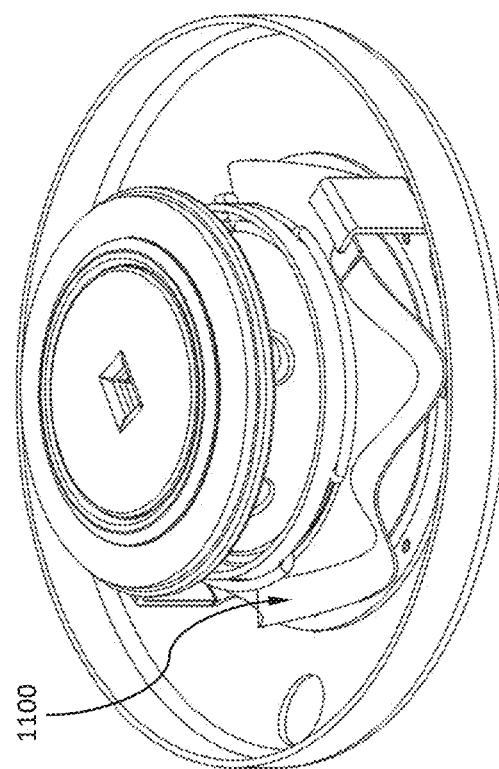
FIGS. 11c and 11d illustrate perspective views of the vented valve cap of FIG. 11b.
Figure 11C:
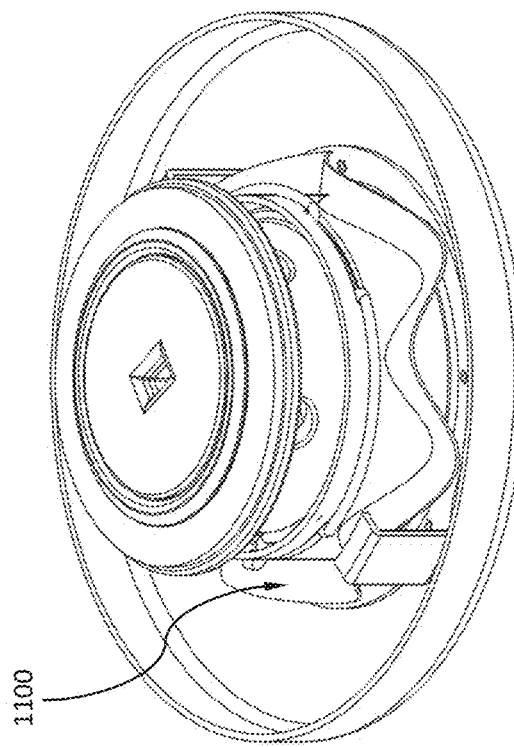

FIG. 11a illustrates an inner cap 102a employing a wave spring stability shim 1100, which may be used as a second alternative to stability shim 118 of FIGS. 1e through 1g. FIG. 11b illustrates an example assembly view of a vented valve cap having a wave spring stability shim 1100, while FIGS. 11c and 11d illustrate perspective views of the vented valve cap of FIG. 11b. As illustrated in FIGS. 11c and 11d, the wave spring stability shim 1100 may be installed to lay adjacent the underside surface of the cap cover 102. The inner diameter of the wave spring stability shim 1100 may be sized and shaped to fit around the cap cover's 102 extruded inner cap's 102a cylindrical cap body (e.g., the main cylindrical portion). The wave spring stability shim 1100 may be fabricated from a pre-hardened flat wire with waves added to yield a spring effect. The waves may be added through a process called on-edge-coiling. During this process, the number of turns and waves can be adjusted to accommodate stronger force or meet specific requirements. The wave spring stability shim 1100 offers a number of advantages over cupped spring washer (also known as a Belleville washer). For example, the axial space can be reduced by 50%, thereby resulting in a significant reduction in weight and production cost. Further, the load in an axial direction is 100% transferable. Finally, a wave spring stability shim 1100 enables a higher thrust load within the limited axial space because only elements of the wave spring stability shim 1100 need to be adjusted (e.g., the size of the wire, the number of waves, the height of waves, and the number of turns) to accommodate such a high thrust load.

Figure 12D:
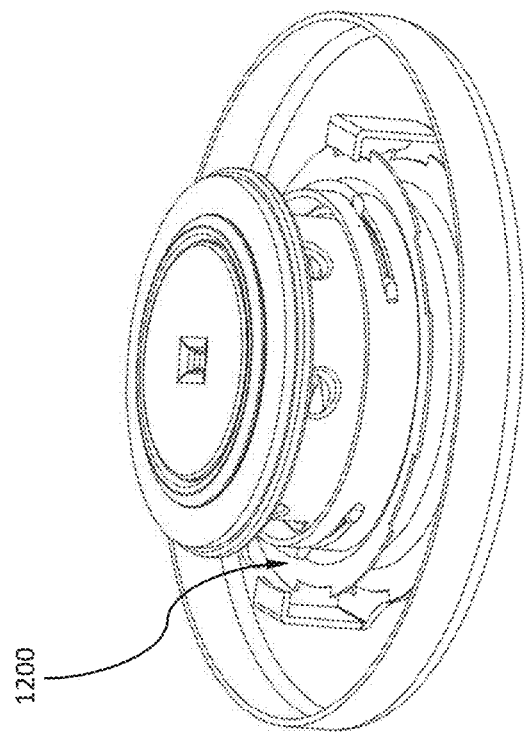
FIGS. 12c and 12d illustrate perspective views of the vented valve cap of FIG. 12b.
Figure 12C:
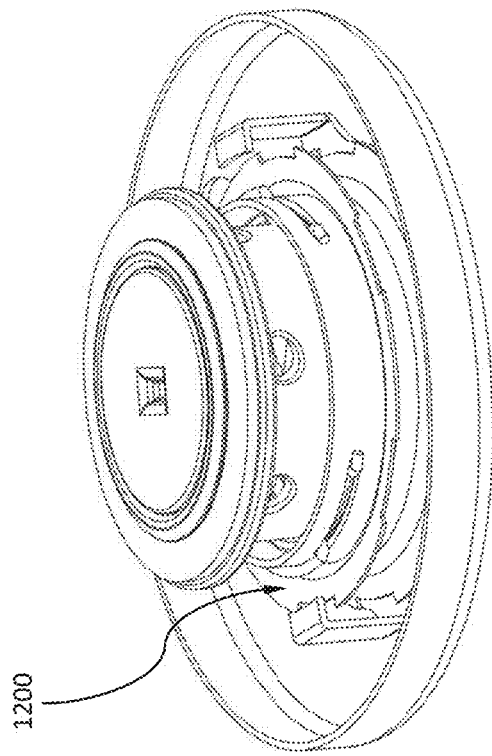

FIG. 12a illustrates an inner cap 102a employing a formed stability shim 1200, which may be used as a third alternative to stability shim 118 of FIGS. 1e through 1g. FIG. 12b illustrates an example assembly view of a vented valve cap having a formed stability shim 1200, while FIGS. 12c and 12d illustrate perspective views of the vented valve cap of FIG. 12b. As illustrated in FIGS. 12c and 12d, the formed stability shim 1200 may be installed to lay adjacent the underside surface of the cap cover 102. The inner diameter of the formed stability shim 1200 may be sized and shaped to fit around the cap cover 102's extruded inner cap's 102a cylindrical cap body. In certain aspects, the formed stability shim 1200 may be fabricated from a fuel-resistant material (e.g., metal, thermoplastic, or other resin), which may be further resistant to ultraviolet (UV) light. For example, the formed stability shim 1200 may be fabricated from one or more non-corrosive metallic materials. The cross sectional profile of the formed stability shim 1200 is generally C-shaped, effectively defining two stacked rings 1204 spaced from one another by a perpendicular connector section 1208. The formed stability shim 1200 may be fabricated from a single material, or as two separate components that are coupled together as a seam. For example, the stacked rings 1204 may be separately formed and joined to one another along a seam 1206. Each stacked ring 1204 may be provided with a plurality of notches 1202 along the circumference, thereby increasing flexibility and adjusting the force. The number and size of the notches 1202 may be adjusted to meet specific requirements. FIGS. 13a through 13c illustrate an inner cap 1300 having a stability ring 1302. The stability ring 1302 and the one or more securing tabs 202 may be fabricated as a single component.

While the forgoing has been described as applied to fuel tanks, specifically, fuel storage tanks, one of skill in the art would recognize that the venting technology taught herein may be employed with other applications where venting of tank or system is desired, such as steam tanks, and other fluid tanks, such as those employed by breweries and distilleries.

The above-cited patents and patent publications are hereby incorporated by reference in their entirety. Although various embodiments have been described with reference to a particular arrangement of parts, features, and the like, these are not intended to exhaust all possible arrangements or features, and indeed many other embodiments, modifications, and variations will be ascertainable to those of skill in the art. Thus, it is to be understood that the invention may therefore be practiced otherwise than as specifically described above.

What is claimed is:

1. A venting apparatus comprising:
    a cap cover having a cylindrical cap body concentric to, and protruding substantially perpendicularly from, an underside surface of the cap cover;
    a bottom assembly slidably engaged with, and concentric to, the cap cover, wherein the bottom assembly is sized and shaped to at least partially reside within the cylindrical cap body,
    the bottom assembly having a vacuum valve slidably engaged with a valve body,
    wherein the vacuum valve and the valve body are arranged substantially concentric to one another, the vacuum valve being moveable between a first position and a second position,
    wherein the vacuum valve prevents flow through the valve body in the first position and permits flow through the valve body in the second position;
    a vacuum spring to bias the vacuum valve in the first position; and
    a pressure spring residing at least partially within each of the valve body portion and the cylindrical cap body, wherein the pressure spring is configured to impart a force to bias said bottom assembly away from said cap cover.

2. The venting apparatus of claim 1, further comprising a keeper device to engage said valve body and said cylindrical cap body, thereby slidably securing the bottom assembly to the cap cover.

3. The venting apparatus of claim 1, wherein the vacuum valve comprises a vacuum base and a vacuum stem perpendicularly positioned relative to said vacuum base.

4. The venting apparatus of claim 3, wherein the valve body comprises (1) a cylindrical valve body portion having a first vent hole and (2) a valve base having a second vent hole and a through hole to receive the vacuum stem, wherein the vacuum base and the valve base are arranged substantially concentric and parallel to one another such that the vacuum base prevents flow through the second vent hole in the first position and permits flow through the second vent hole in the second position, the vacuum base being biased in the first position by the vacuum spring.

5. The venting apparatus of claim 1, wherein the valve body comprises a slot and the keeper device includes an indentation to engage the slot.

6. The venting apparatus of claim 1, wherein the cap cover further comprises a securing tab to engage a fill cap base.

7. The venting apparatus of claim 6, wherein the pressure spring is configured to impart a sealing force to form a seal between the bottom assembly and the fill cap base when the cap cover engages the fill cap base, wherein the bottom assembly is configured to move toward said cap cover when a positive pressure at the fill cap base overcomes the sealing force, thereby breaking a seal between the bottom assembly and the fill cap base.

8. The venting apparatus of claim 6, wherein the vacuum valve is configured to move to the second position when a negative pressure at the fill cap base overcomes the vacuum spring's force.

9. The venting apparatus of claim 1, further comprising a pressure gasket positioned on the valve body, the pressure gasket to form an airtight seal between the valve body and a fill cap base.

10. The venting apparatus of claim 1, further comprising a vacuum gasket positioned on the vacuum valve, the vacuum gasket to form an airtight seal between the vacuum valve and the valve body.

11. The venting apparatus of claim 1, further comprising a stability shim positioned at the underside surface of the cap cover, whereby the stability shim is configured to mitigate lateral movement of the venting apparatus when installed upon a fill cap base.

12. The venting apparatus of claim 3, wherein the vacuum stem passes through the vacuum spring, the vacuum stem being configured to secure an end of the vacuum spring at the vacuum stem's distal end.

13. A fuel cap comprising:
a top assembly having a cap cover and a cylindrical cap body, the cylindrical cap body protruding substantially perpendicularly from an underside surface of the cap cover;
a bottom assembly slidably engaged with, and concentric to, the top assembly, the bottom assembly having a vacuum valve operatively coupled with a valve body, wherein the vacuum valve is moveable between a first position to prevent flow through the valve body and a second position to permit flow through the valve body in the second position;
a keeper device to slidably secure the bottom assembly to the top assembly, wherein the bottom assembly is sized and shaped to at least partially reside within the cylindrical cap body; and
a pressure spring to impart a force to bias said bottom assembly away from said top assembly.

14. The fuel cap of claim 13, further comprising a vacuum spring to bias the vacuum valve in the first position.

15. A venting apparatus comprising:
a cap assembly, the cap assembly having a cap cover and a cylindrical cap body, the cylindrical cap body protruding substantially perpendicularly from an underside surface of the cap cover;
a bottom assembly slidably engaged with, and concentric to, the cap assembly, the bottom assembly having a vacuum valve operatively coupled with a valve body, wherein the valve body comprises a cylindrical valve body portion, the cylindrical valve body portion sized and shaped to reside at least partially within the cylindrical cap body,
wherein the vacuum valve is moveable between a first position to prevent flow through the valve body and a second position to permit flow through the valve body in the second position; and
a pressure spring, the pressure spring residing at least partially within each of the cylindrical valve body portion and the cylindrical cap body, wherein the pressure spring is configured to impart a force to bias said bottom assembly away from said cap assembly.

16. The venting apparatus of claim 15, wherein the venting apparatus is configured to engage a fill cap base, the bottom assembly being configured to move toward said top assembly when a positive pressure at the fill cap base overcomes the pressure spring to break a seal between the bottom assembly and the fill cap base.

17. The venting apparatus of claim 15, wherein (1) the vacuum valve comprises a vacuum base and a vacuum stem perpendicularly positioned relative to said vacuum base, and (2) the valve body comprises a valve base at a first end of said cylindrical valve body portion, the valve base having a second vent hole and a through hole to receive the vacuum stem.

18. The venting apparatus of claim 17, wherein the vacuum valve is configured to move to the second position when a negative pressure at a fill cap base overcomes the vacuum spring's force, thereby permitting flow through the first vent hole and the second vent hole.

19. The fuel cap of claim 14, further comprising (1) a pressure gasket positioned on the valve body, the pressure gasket to form an airtight seal between the valve body and a fill cap base, and (2) a vacuum gasket positioned on the vacuum valve, the vacuum gasket to form an airtight seal between the vacuum valve and the valve body.

20. The venting apparatus of claim 15, further comprising (1) a pressure gasket positioned on the valve body, the pressure gasket to form an airtight seal between the valve body and a fill cap base, and (2) a vacuum gasket positioned on the vacuum valve, the vacuum gasket to form an airtight seal between the vacuum valve and the valve body.

* * * * *